United States Patent
Trudeau et al.

(10) Patent No.: US 11,068,492 B2
(45) Date of Patent: Jul. 20, 2021

(54) SYSTEMS AND METHODS FOR COMBINED SEARCH AND CONTENT CREATION

(71) Applicant: salesforce.com, inc., San Francisco, CA (US)

(72) Inventors: Lorne Keith Trudeau, Bainbridge Island, WA (US); Richard L. Spencer, II, Seattle, WA (US); Scott Perket, San Francisco, CA (US); Anna Mieritz, Montara, CA (US); James D. Vogt, Foster City, CA (US)

(73) Assignee: salesforce.com, inc., San Francisco, CA (US)

( * ) Notice: Subject to any disclaimer, the term of this patent is extended or adjusted under 35 U.S.C. 154(b) by 52 days.

(21) Appl. No.: 14/256,805

(22) Filed: Apr. 18, 2014

(65) Prior Publication Data

US 2014/0317092 A1    Oct. 23, 2014

Related U.S. Application Data

(63) Continuation-in-part of application No. 14/207,111, filed on Mar. 12, 2014, now Pat. No. 10,120,914.

(60) Provisional application No. 61/813,948, filed on Apr. 19, 2013.

(51) Int. Cl.
*G06N 5/02* (2006.01)
*G06F 16/248* (2019.01)

(52) U.S. Cl.
CPC ............ *G06F 16/248* (2019.01); *G06N 5/02* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |

(Continued)

OTHER PUBLICATIONS

Non-Final Office Action from U.S. Appl. No. 14/207,111 dated Jul. 1, 2016, 17 pgs.

(Continued)

*Primary Examiner* — Wilbert L Starks
(74) *Attorney, Agent, or Firm* — Jaffery Watson Mendonsa & Hamilton LLP

(57) ABSTRACT

Methods and apparatuses for search and content creation. A partial input is received via a user interface of an electronic computing device. The partial input to be used for content creation. A search query is generated in response to receiving the partial input. A structured data repository is searched for objects matching the partial input. Results from the searching of the data repository are provided. Suggested content to be created from the displayed results is generated.

18 Claims, 21 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0124276 A1 | 5/2007 | Weissman et al. |
| 2010/0281014 A1 | 11/2010 | Weissman et al. |
| 2011/0258179 A1 | 10/2011 | Weissman et al. |
| 2011/0258199 A1* | 10/2011 | Oliver .............. G06F 16/24578 707/746 |
| 2011/0264681 A1 | 10/2011 | Kimberlin et al. |
| 2011/0295838 A1 | 12/2011 | Collins et al. |
| 2011/0295839 A1 | 12/2011 | Collins et al. |
| 2012/0078825 A1 | 3/2012 | Kulkarni et al. |
| 2012/0198334 A1* | 8/2012 | Surin .................. G06Q 10/101 715/716 |
| 2013/0054582 A1 | 2/2013 | Macklem |
| 2013/0073546 A1 | 3/2013 | Yan et al. |

OTHER PUBLICATIONS

Craig, Weissman D., et al., "The Design of the Force.com Multitenant Internet Application Development Platform", SIGMOD'09, Jun. 29-Jul. 2, 2009, Providence, Rhode Island, USA.

Final Office Action from U.S. Appl. No. 14/207,111 dated Nov. 25, 2016, 17 pgs.

Non-Final Office Action for U.S. Appl. No. 14/207,111 dated Apr. 17, 2017, 12 pages.

Final Office Action for U.S. Appl. No. 14/207,111 dated Sep. 22, 2017, 13 pages.

Non-Final Office Action for U.S. Appl. No. 14/207,111 dated Jan. 22, 2018, 14 pages.

Notice of Allowance for U.S. Appl. No. 14/207,111 dated Jul. 5, 2018, 8 pages.

* cited by examiner

US 11,068,492 B2

SYSTEMS AND METHODS FOR COMBINED SEARCH AND CONTENT CREATION

CLAIM OF PRIORITY

This United States continuation-in-part patent application is related to, and claims priority to U.S. patent application Ser. No. 14/207,111 filed Mar. 12, 2014, entitled "MECHANISM FOR FACILITATING IMPROVED SEARCHING," and is further related to and claims priority to U.S. Provisional Patent Application No. 61/813,948 filed Apr. 19, 2013, entitled "SYSTEM AND METHOD FOR SIMULTANEOUSLY SEARCHING AND CREATING CONTENT," the entire contents of which are incorporated herein by reference.

TECHNICAL FIELD

The technology disclosed can create a single starting point for creation and search of data. In some implementations, for example, content search, the content can be automatically created. In some implementations, publisher objects can support complex actions and publisher object pickers can adjust workflows, for example, create contacts, follow up tasks, etc.

BACKGROUND

In information management environments, for example, databases, multitenant database environments, customer relationship management (CRM) systems, the process for finding information (e.g., records) is separate and distinct from the process for creating the information within the environment. This can result in inefficiencies, duplications and/or other undesirable results.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Described herein are techniques for combined search and creation in an information management environment. Many of the examples that follow are provided in terms of social media mechanisms, on-demand services environments, multitenant database environments or customer relationship management (CRM) environments; however, the techniques for combined search and creation are not limited to those implementations. For example, a user may access a search and/or sharing tool (e.g., a dialog box, a search field) and provide content to be shared or terms to be searched. As the content/terms are entered, a user may be provided with suggested or anticipated results. The user can select from the results as a mechanism to share objects included in the results and/or the process of content creation can be automatically started with information from the results.

Figure 1:
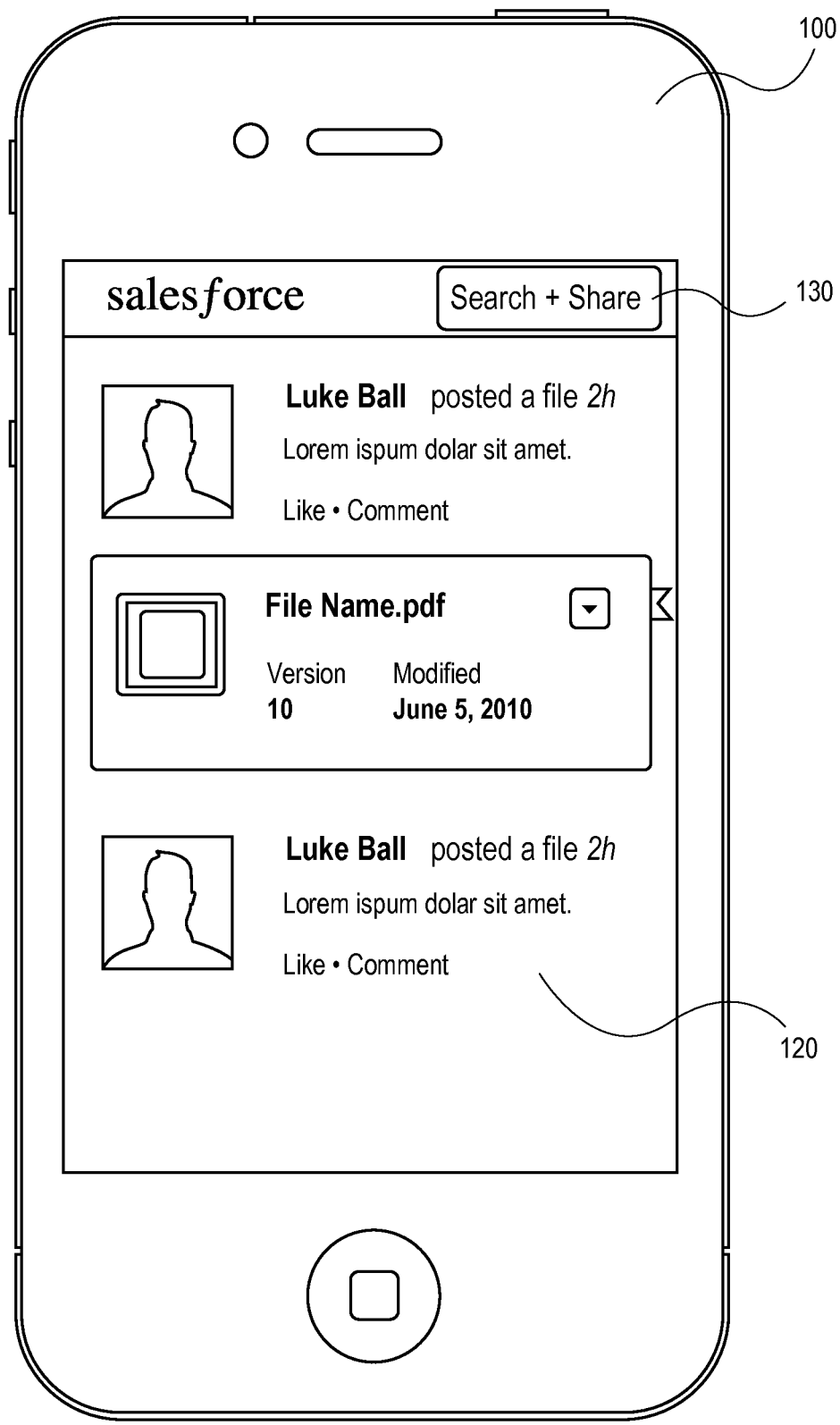
FIG. 1 is an illustration of one embodiment of a mobile device providing a combined search and share functionality.

FIG. 1 is an illustration of one embodiment of a mobile device providing a combined search and share functionality. While the example of FIG. 1 is directed to a mobile device, the functionality described is applicable to other types of devices as well, for example, desktop, wearable, transportation, kiosks, etc.

Mobile device 100 can be any type of mobile device (e.g., smartphone, tablet) and can provide interface 120 as an app or via a browser. In one embodiment, interface 120 provides search and share box 130, which provides a user with the ability to search as well as share (or create) content in one process. Interface 120 may be an interface for a social media feed, contacts, email, CRM and/or other type of application that may utilize or access stored information. The stored information may be stored locally on mobile device 100 and/or be remotely accessible by mobile device 100. The example of FIG. 1 is that of a social media feed with an object attached to one of the posts; however, the combined search and share functionality is equally applicable to any situation in which files and information can be shared electronically.

Figure 2:
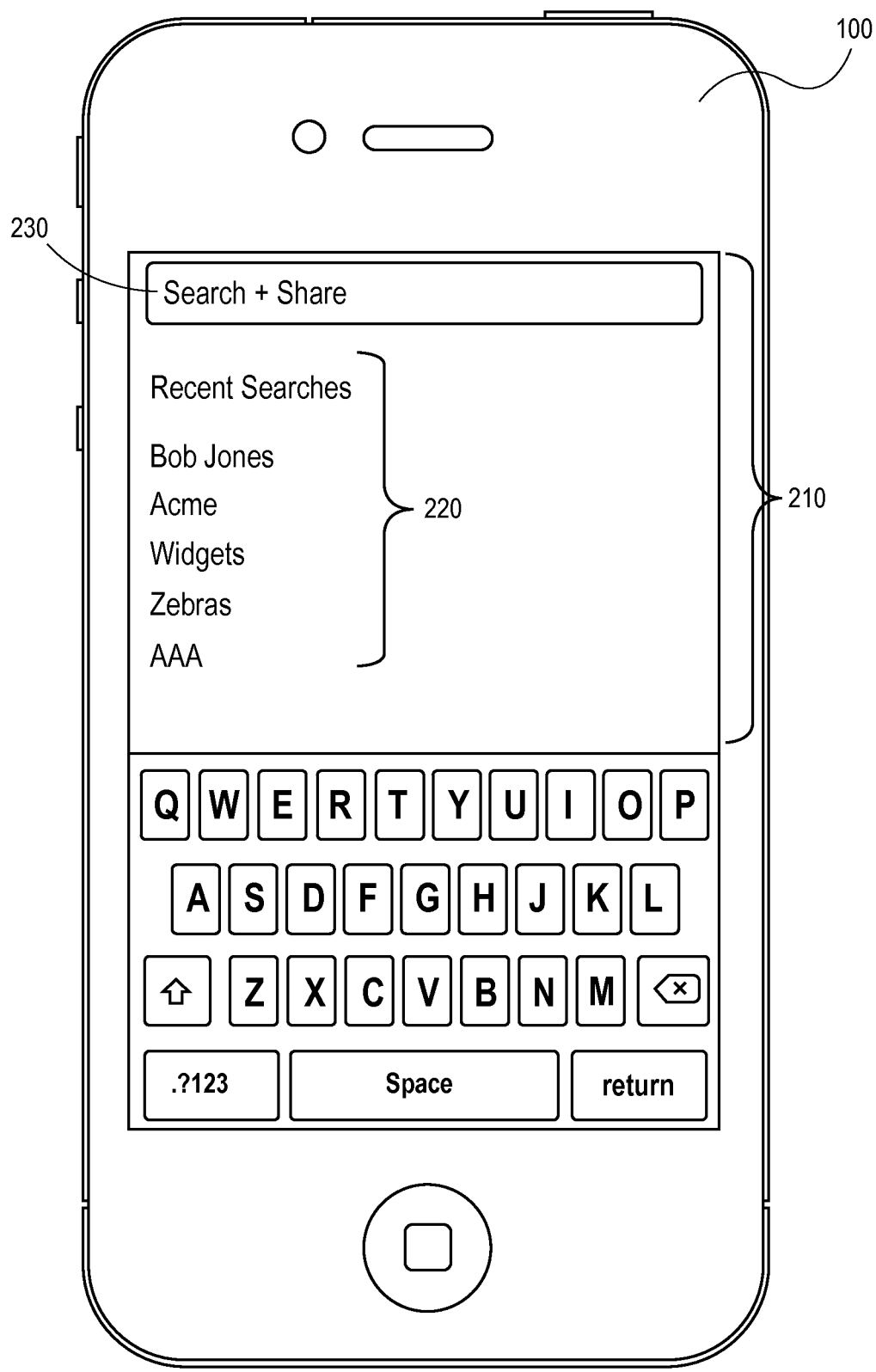
FIG. 2 is an illustration of the mobile device when the combined search and share functionality is being utilized.

FIG. 2 is an illustration of the mobile device 100 when the combined search and share functionality is being utilized. Search and share interface 210 may be accessed, for example, by a user selecting search and share box 130 from FIG. 1. Search and share interface 210 may be accessed in other way as well, for example, via voice command, shaking the device, pressing a button, or via other input.

In one embodiment, search and share interface 210 includes a list of recent (or common) searches 220 so that a user may select a recent or common searches rather than typing the search request. Search and share interface 210 allows a user to provide input to search and share box 230. The input that is provided via search and share box 230 may be the basis for a search and/or for a sharing or creation of content. Search, sharing and/or creation is described in greater detail below.

In one implementation, the search and share interface 210 analyzes the data being input by the user to determine whether the user is attempting to search for information, create content, share data with others, and/or performing a combination of the three. Search and share interface may perform the analysis by looking for keywords or symbols that designate the type of input being input. For example, when a user inputs an "@" symbol, the search and share interface may assume that the user is attempting to share information with another user. Similarly, if the user inputs random keywords that include no special symbols, the search and share interface may determine that the user is performing a search. Additional analysis can be performed to determine whether the input from the user is a name, a date, a company name, etc. For example, as the user is entering input, the search and share interface may request a data lookup in a connected database to determine whether the input matches existing data in the database. If the database finds a match, the search and share interface can make an assessment about the type of data being input. Figures below recite example of this.

Figure 3:
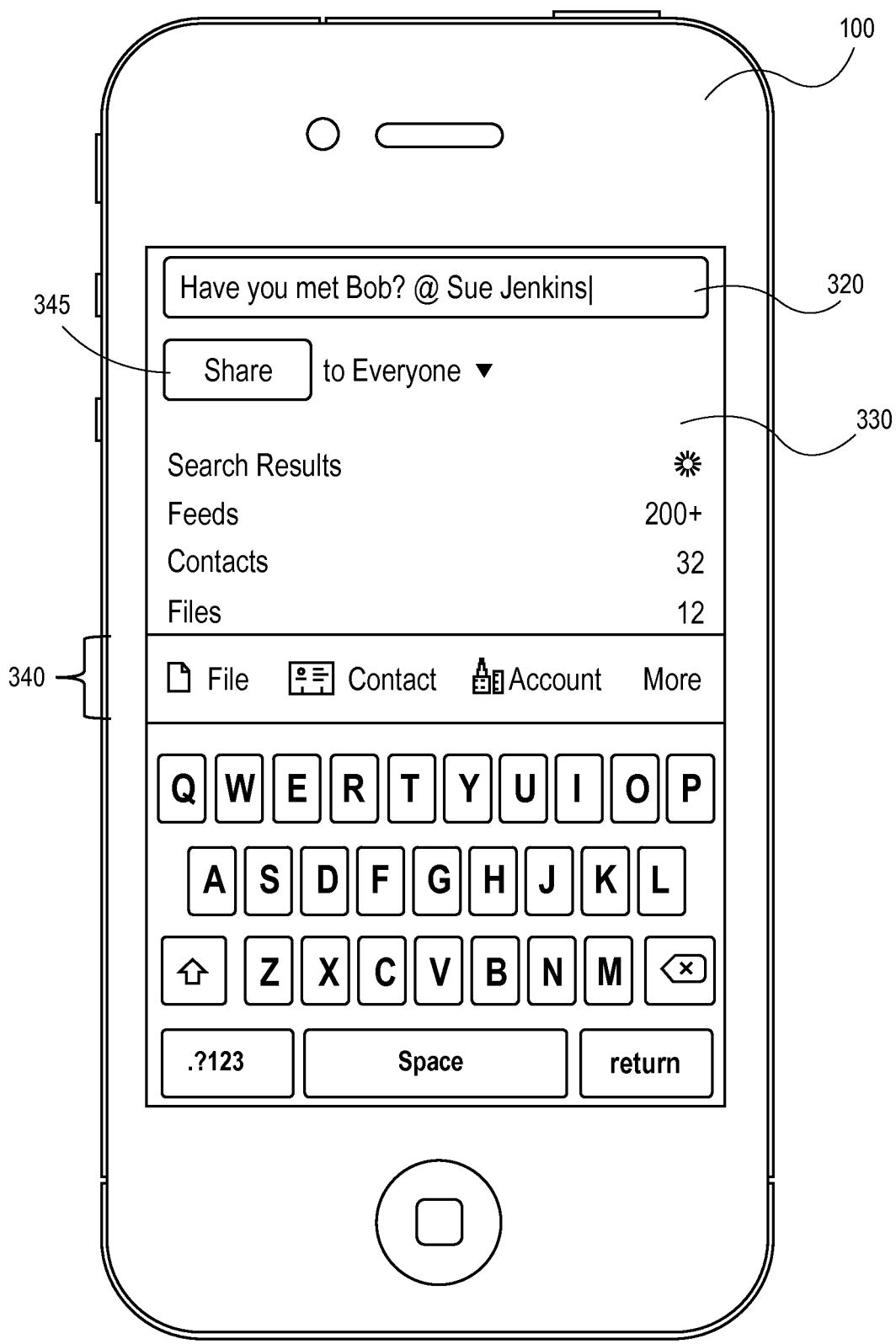
FIG. 3 is an illustration of the mobile device when the combined search and share functionality is being utilized for sharing.

FIG. 3 is an illustration of the mobile device 100 when the combined search and share functionality is being utilized for sharing. In the example of FIG. 3, the phrase "Have you met Bob? @ Sue Jenkins" is entered in search and share box 320. In one embodiment, the "@" symbol helps the system determine that this is a request to share. In one implementation, the process of searching and/or content creation/sharing can be performed on partial input in the same manner, as described in greater detail below.

As input is provided via search and share box 320, relevant data repositories can be searched for matching data. In the example of FIG. 3, all or a subset of data accessible by the app or user or device 100 (e.g., contacts, files, emails, web history, feeds) can be searched for entries having "Bob" as a component. In the example of FIG. 3, user interface 330 provides a listing of various objects having "Bob" as a component grouped by object type (e.g., feeds, contacts, files).

Providing this information during the process of sharing (or creating) content can be referred to as "structured data deflection" because data is retrieved that "deflects" the user from having to recreate content and/or from having to explicitly search for content to share. When the user is ready to share the content in search and share box 320, the user can select the share button 350. The content in search and share box 320 along with any attached object can be shared, for example, as an email message, instant message, social media post, etc.

In one embodiment, user interface 330 includes object bar 340 that has icons or other indicators for objects that can be included in shared content or for which content can be created. When a user has provided the content he/she wishes to share he/she can select or press share button 345. In one embodiment, a user can select an object to be shared via object bar 340 or via the search results displayed via user interface 330.

Figure 4:
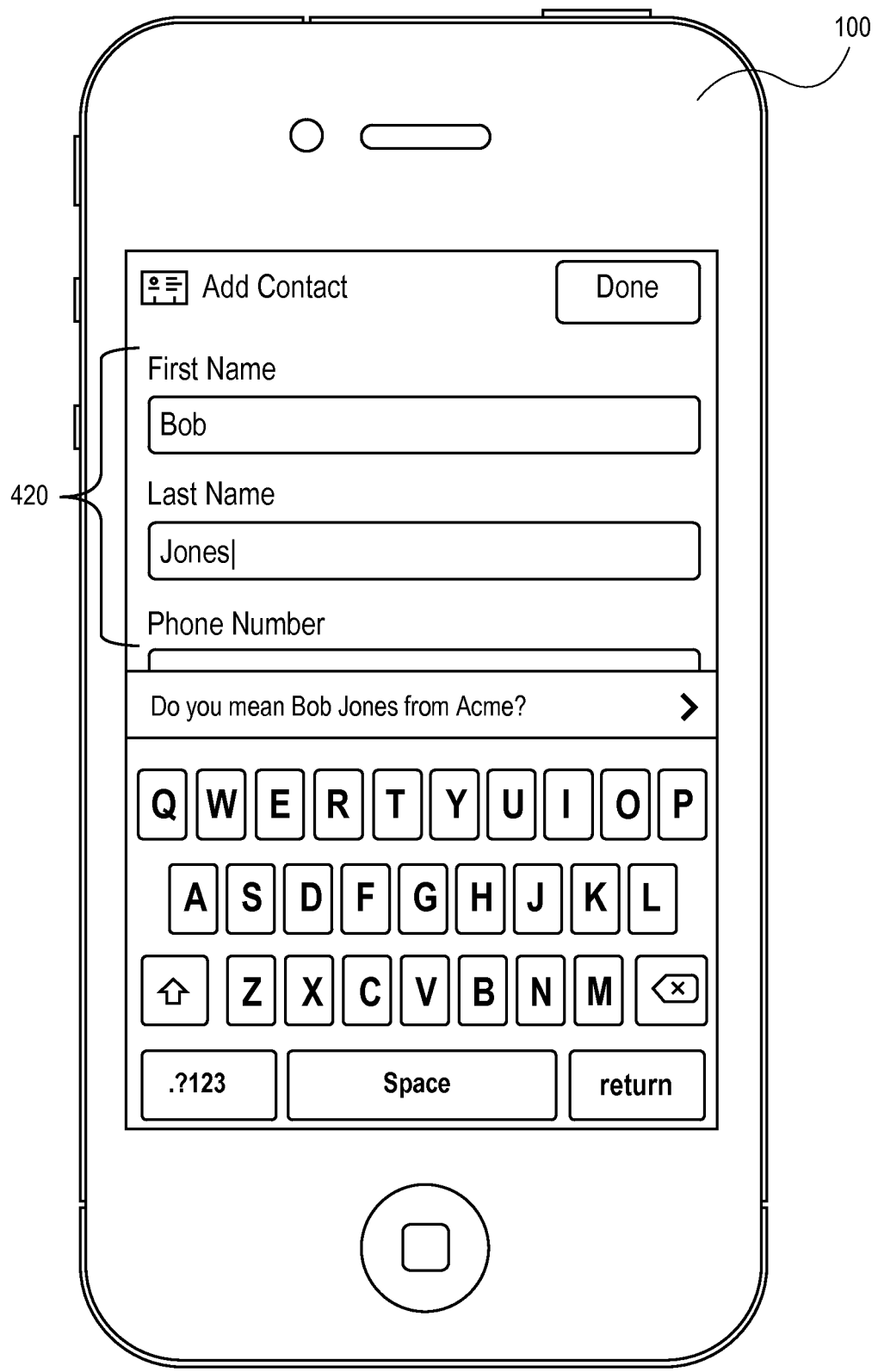
FIG. 4 is an illustration of a mobile device on which content is created using a combined search and share functionality.

FIG. 4 is an illustration of a mobile device 100 on which content is created using a combined search and share functionality. A user may arrive at contact creation interface 420 by selecting "contacts" from object bar 340 of FIG. 3. Alternatively, the search and share box may detect that a name has been or is being input, and ask the user if they are entering a contact's information. In response, a user of mobile device 100 may be provided with content creation interface 420 with one or more fields populated based on data entered in search and share box 320 of FIG. 3.

In the example, "Bob" may be automatically populated in the first name field of a contact creation screen. Additional information may be automatically populated if available, for example, "Do you mean Bob Jones from Acme?" can allow the user to retrieve a previously created contact file rather than creating a new contact file. For example, a first name may be provided in search and share box 320. Automatically populating contact information from a social media post, or other sharing/creation mechanism, can simplify the user experience and reduce opportunities for duplicate data.

Figure 5:
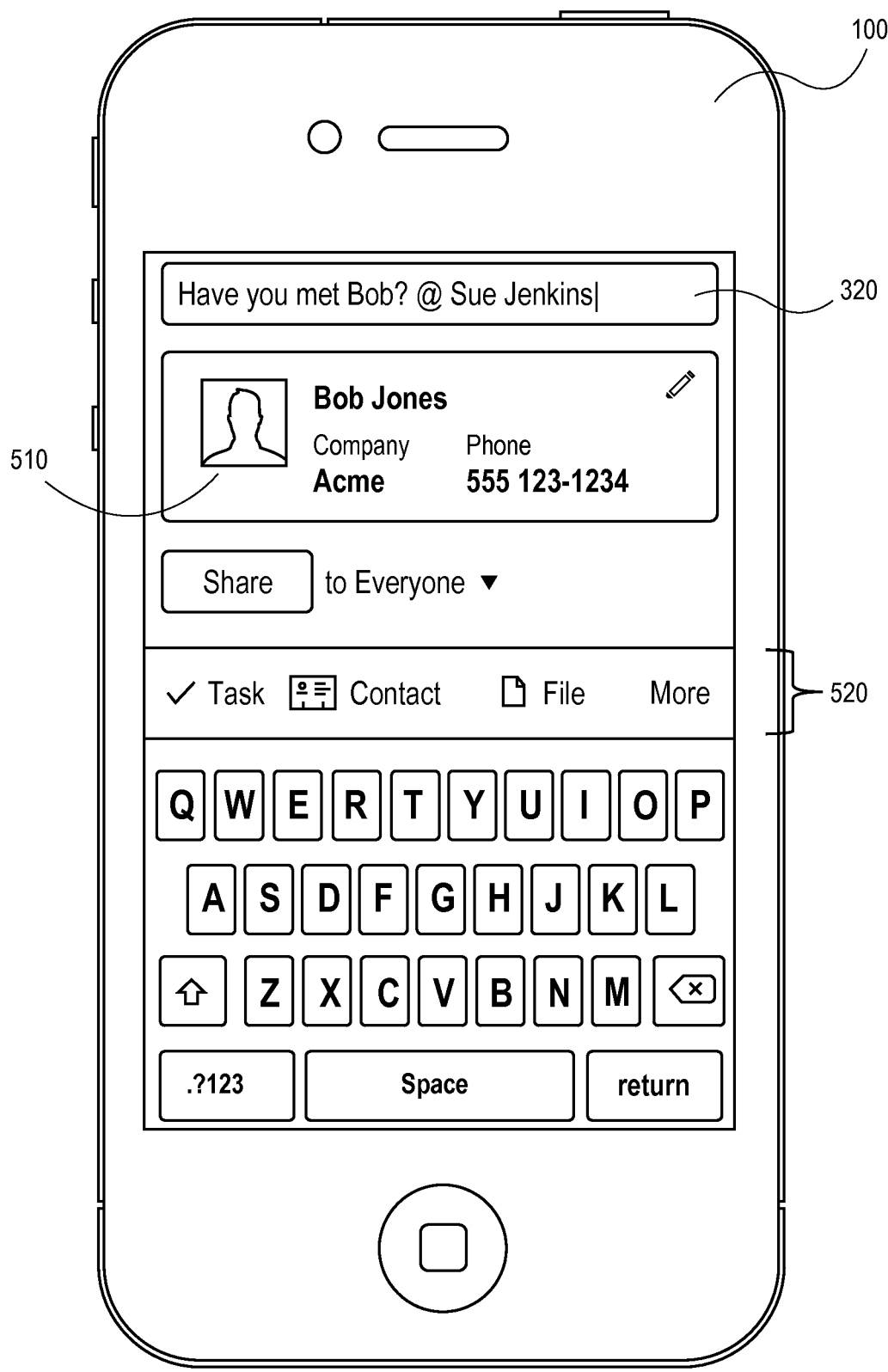
FIG. 5 is an illustration of a mobile device configurable to share content created in part via the sharing process.

FIG. 5 is an illustration of a mobile device 100 configurable to share content created in part via the sharing process. In the example of FIG. 5, the contact 510 that is found or created or found as described above can be shared via a social media post, instant message, email message, etc. The search and share box 320 can have attached to it contact object 510 that was found or created as described above. Contact object 510 can be part of the post/message, for example, it can be an attachment to a social media feed. Using the combined search creation/sharing mechanisms described herein a more efficient and/or more robust social media mechanism can be provided.

In one embodiment, the user interface can include more button 520 that can provide access to additional operations/features that are not immediately accessible from the interface of FIG. 5. Thus, a mobile device interface may be simplified in order to operate effectively with the reduced screen area of a mobile device such as a smart phone.

Figure 6:
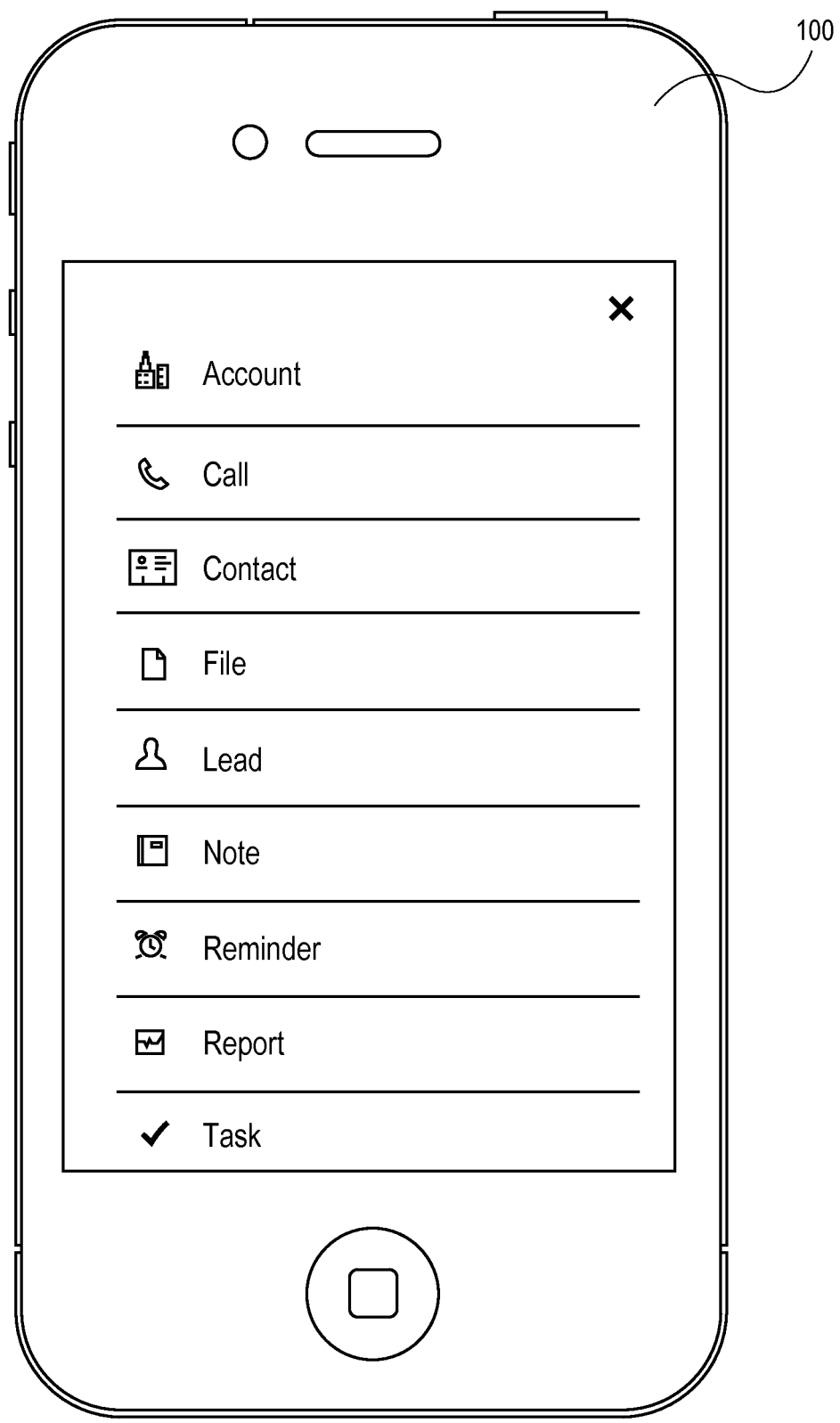
FIG. 6 is an illustration of object types/functions that can be accessed via a combined search and share/create interface.

FIG. 6 is an illustration of object types/functions that can be accessed via a combined search and share/create interface in a mobile device 100. The objects/functions of the example in FIG. 6 include Accounts, Call, Contacts, Files, Leads, Notes, Reminders, Reports and Tasks. Different and/or additional objects/functions can also be supported.

Figure 7:
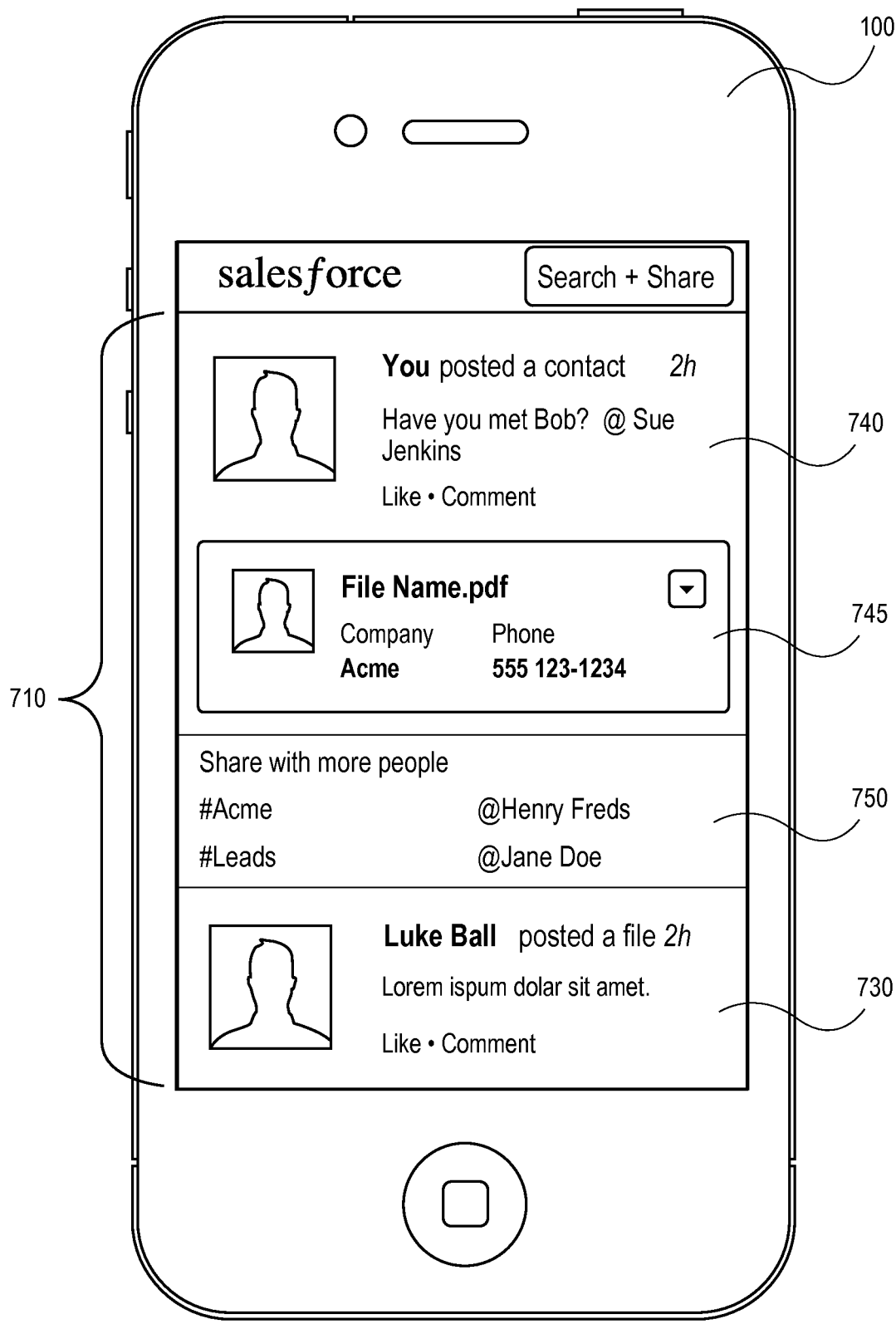
FIG. 7 is an illustration of a feed on a mobile device that can utilize a search and share/create functionality.

FIG. 7 is an illustration of a feed on a mobile device 100 that can utilize a search and share/create functionality. In the example of FIG. 7, feed 710 can present posts 730, 740 from one or more users. Feed 710 can be, for example, a Chatter® feed. In one embodiment, Chatter is a social media mechanism that provides a real-time collaboration platform for users. In one embodiment, Chatter has an associated service that sends information proactively via a real-time news stream that allows users to follow coworkers and data to receive broadcast updates about project and customer status and users can also form groups and post messages on each other's profiles to collaborate on projects. Chatter is provided by salesforce.com of San Francisco, Calif.

As another example, feed 710 can be a Twitter feed. Twitter® is an online social networking service and that allows users to send and read text-based messages of up to 140 characters, known as "tweets". Twitter is provided by Twitter, Inc. of San Francisco, Calif.

As another example, feed 710 may be a series of instant messages between two or more users. Instant messaging (IM) is a form of communication over the Internet that offers quick transmission of text-based messages from sender to receiver. In push mode between two or more people using personal computers or other devices, along with shared clients, instant messaging offers real-time direct written language-based online chat. The user's text is conveyed over a network, such as the Internet. It may address point-to-point communications as well as multicast communications from one sender to many receivers. More advanced instant messaging allows enhanced modes of communication, such as live voice or video calling, video chat and inclusion of hyperlinks to media.

Feed 710 can include any number of posts (e.g., 730, 740) and can be organized in any manner (e.g., based on time, based on source, based on attachments, based on type). In one embodiment, posts can include attached objects. For example, post 740 "Have you met Bob? @ Sue Jenkins" can include the contact object for Bob Jones that may have been found and/or attached/shared as described above. Feed 710 can also include additional suggestions for people to share with and/or labels/groups to apply to the post 750. Other types of suggestions can also be provided.

Figure 8:
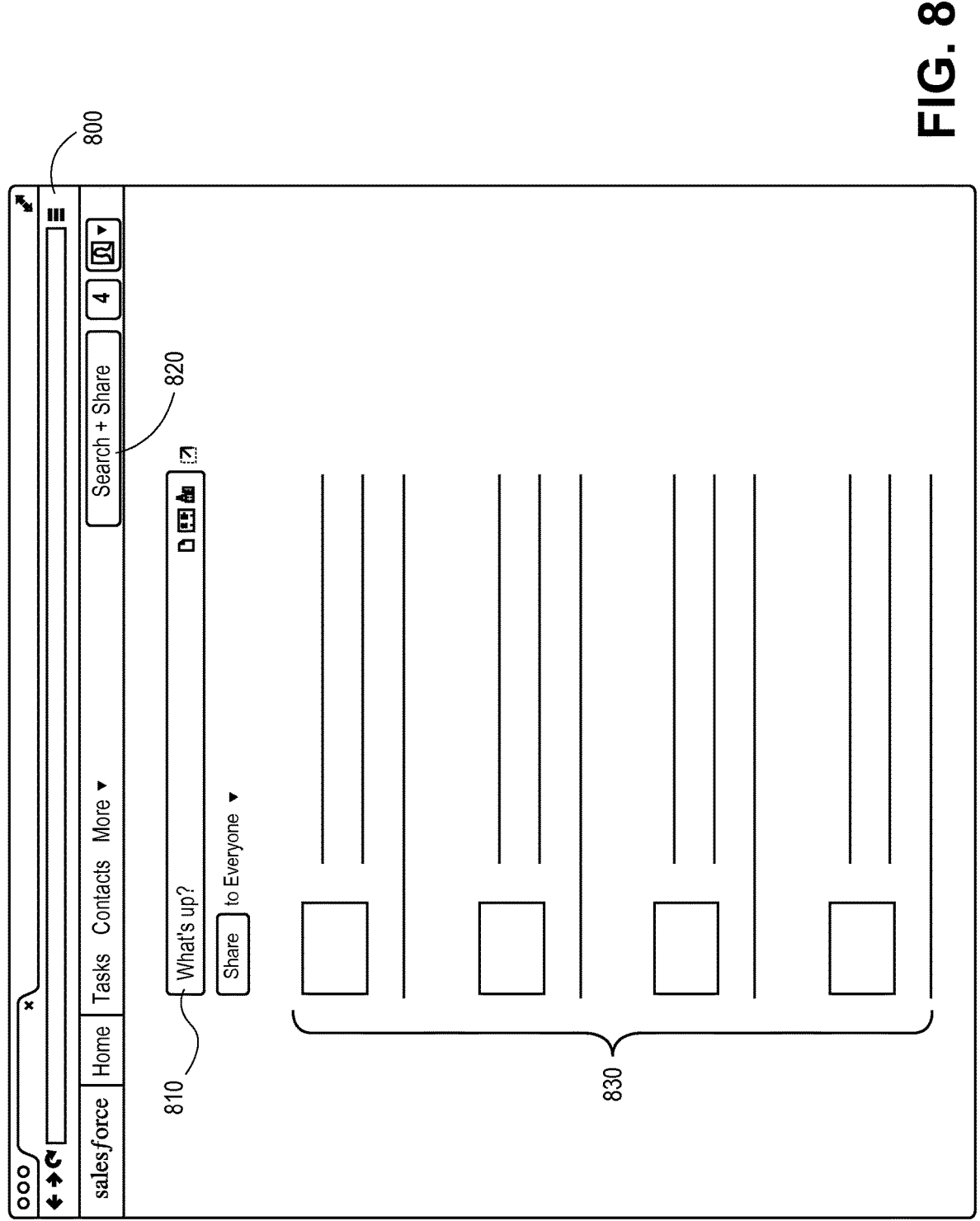
FIG. 8 is an illustration of one embodiment of a search and share mechanism in a desktop computing environment.

FIG. 8 is an illustration of one embodiment of a search and share mechanism in a desktop computing environment. While the example of FIG. 8 is directed to a desktop device, the functionality described is applicable to other types of devices as well, for example, mobile devices, wearable devices, transportation, kiosks.

In one embodiment, browser window 800 is used to access a social media mechanism (e.g., Chatter, Twitter, LinkedIn®, Facebook®, Google+®, Instagram®) that includes status box 810. In one embodiment, browser window 800 also provides search and share box 820. In alternate embodiments, status box 810 may provide the search and share functionality described herein. Browser window 800 can include social media feed 830 that can include posts from multiple users/groups. The posts can include text, pictures, files, etc.

Figure 9:
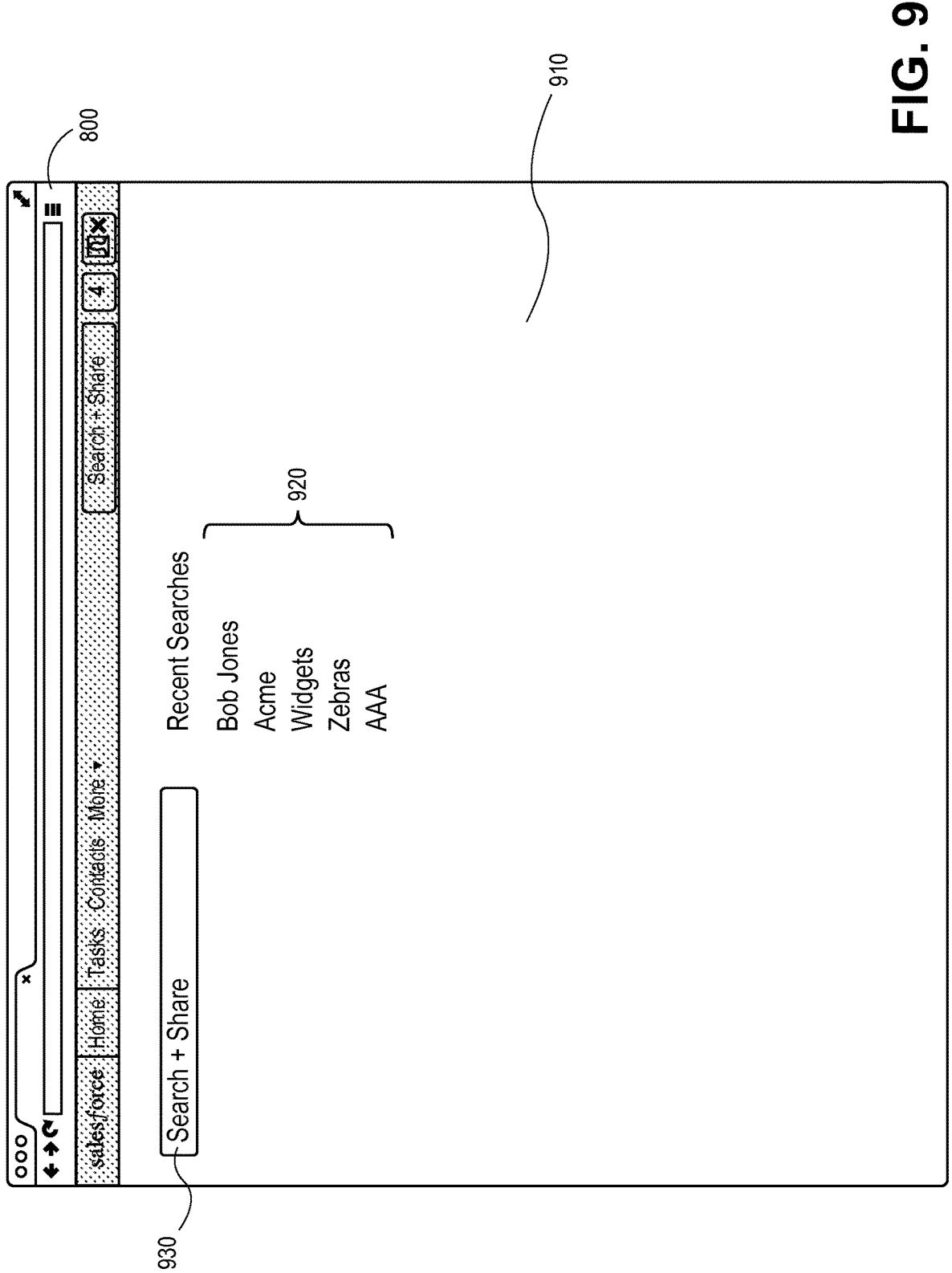
FIG. 9 is an illustration of the combined search and share functionality being utilized via a browser.

FIG. 9 is an illustration of the combined search and share functionality being utilized via a browser 800. Search and share interface 910 may be accessed, for example, by a user selecting search and share box 820 from FIG. 8. Search and share interface 910 may be accessed in other way as well, for example, via voice command, pressing a button, or via other input.

In one embodiment, search and share interface 910 includes a list of recent (or common) searches 920 so that a user may select a recent or common searches rather than typing the search request. Search and share interface 910 allows a user to provide input to search and share box 930.

The input that is provided via search and share box 930 may be the basis for a search and/or for a sharing or creation of content.

Figure 10:
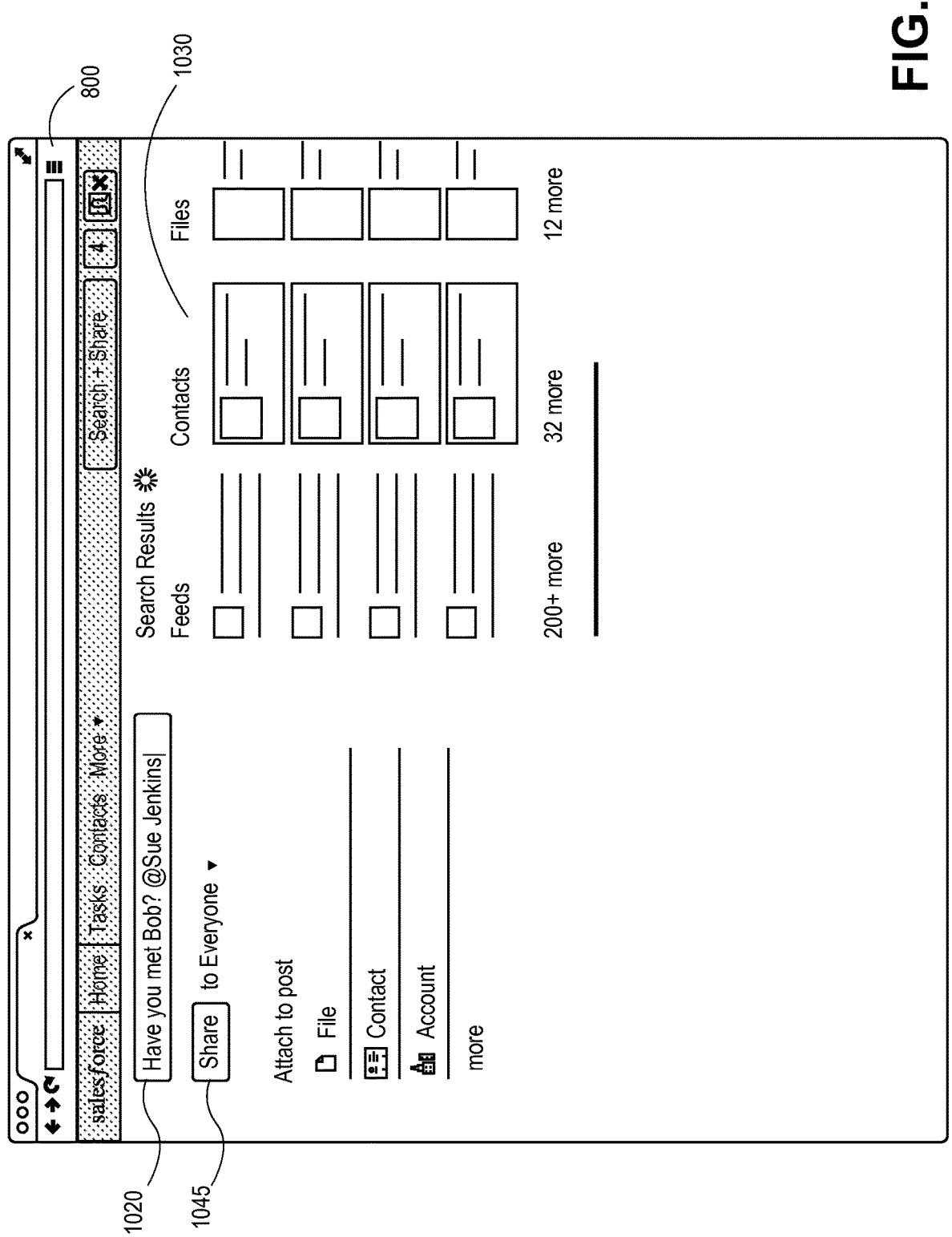
FIG. 10 is an illustration of the combined search and share functionality being utilized for sharing via a browser.

FIG. 10 is an illustration of the combined search and share functionality being utilized for sharing via a browser 800. In the example of FIG. 10, the phrase "Have you met Bob? @ Sue Jenkins" is entered in search and share box 1020. Analysis of the input, as described above, may determine that this is a request to share information. In one embodiment, the process of searching and/or content creation/sharing can be performed on partial input in the same manner.

As input is provided via search and share box 1020, relevant data repositories can be searched for matching data. In the example of FIG. 10, all or a subset of data accessible by the browser or device running the browser (e.g., contacts, files, emails, web history, feeds) can be searched for entries having "Bob" as a component. In the example of FIG. 10, user interface 1030 provides a listing of various objects having "Bob" as a component grouped by object type (e.g., feeds, contacts, files). The user can select one or more of the listed objects to share. When a user has provided the content he/she wishes to share he/she can select or press share button 1045.

Figure 11:
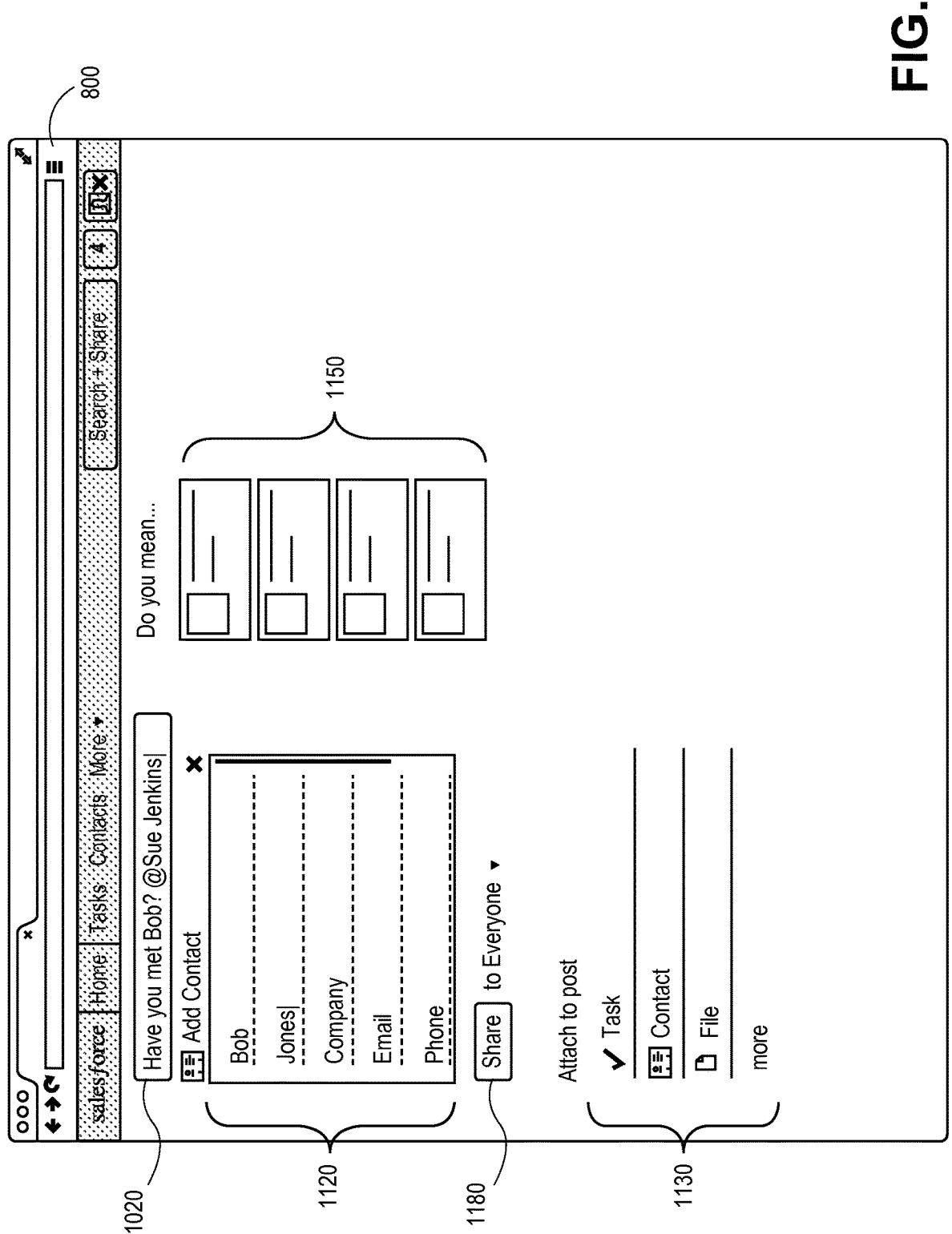
FIG. 11 is an illustration of a sharing and creation interface that can be utilized via a browser.

FIG. 11 is an illustration of a sharing and creation interface that can be utilized via a browser 800. The interface can provide search and share box 1120 that operates as described above. If the user desires to create content (e.g., create a new contact), the interface may search based on the content provided/added by the user and provide refined suggested search results 1150. In one embodiment, refined suggested results 1150 can be limited to the type of object the user is creating. The interface may also provide a listing of other types of objects 1130 that the user may add to the post.

In one embodiment, suggested search results can be further refined with auto-complete fills in results that match the string that a user has typed as the user is typing. Auto-complete, in one embodiment, uses both a user's recent items, which are records that they have recently viewed, edited or looked up and associated to a record, and a user's recent searches, which are the search terms the user has executed searches on.

Auto-complete on recent items affords the user the opportunity to quickly access records that are in regular use quickly, bypassing search and taking the user straight to the detail page for a record if they select it from the auto-complete drop down. This brings context to the search function because the behavior is based on user history. In one embodiment, as the user types, the list is progressively refined to match the string the user has typed.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one of one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

Figure 12:
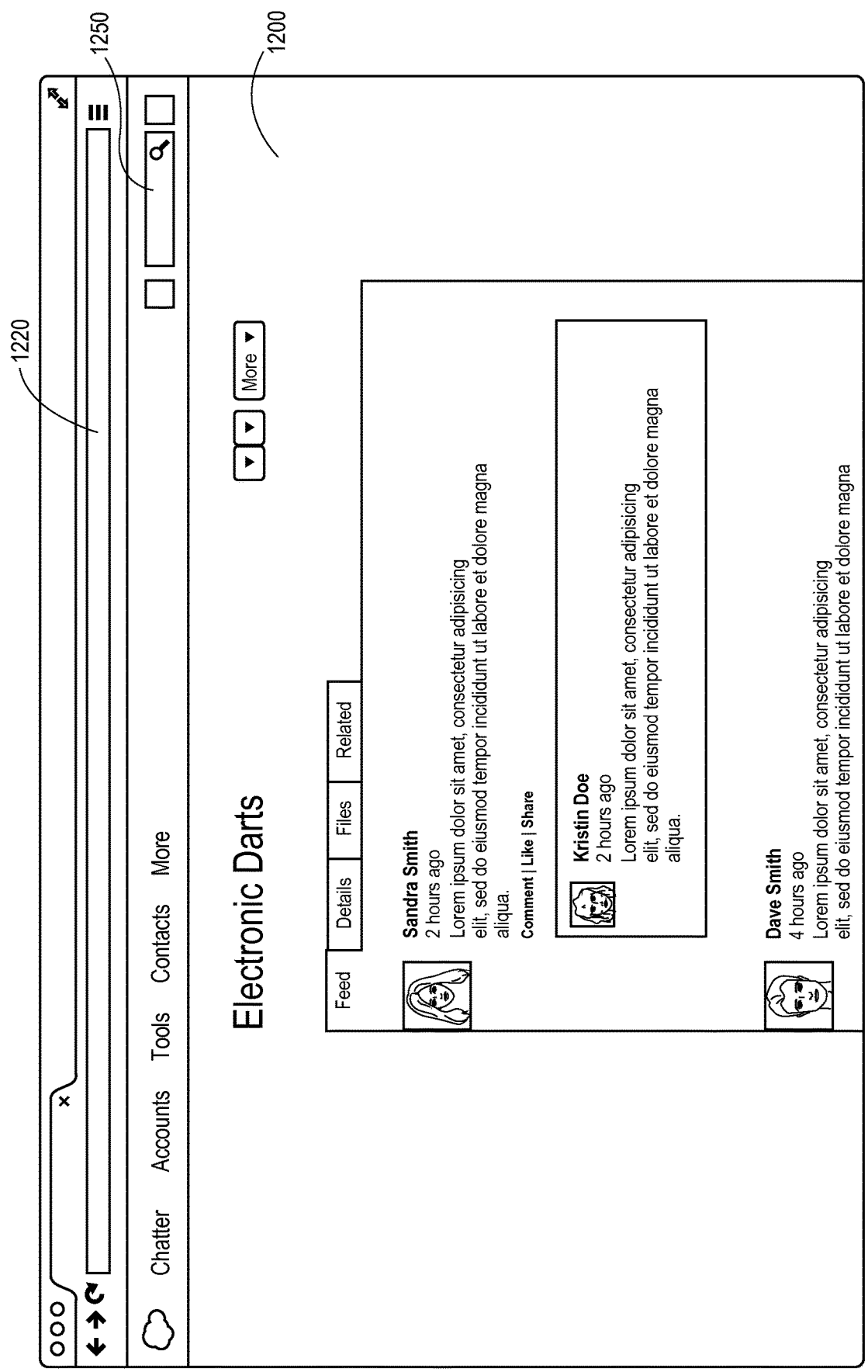
FIG. 12 is a graphical illustration of one embodiment of a on-demand services environment home screen that may be provided by a system utilizing the search and share/create functionality as described herein.

FIG. 12 is a graphical illustration of one embodiment of an on-demand services environment home screen that may be provided by a system utilizing the search and share/create functionality as described herein. Home screen 1200 can include any number of items useful to a user. In one embodiment, home screen 1200 is accessible via a browser application having window 1220 to allow the user to navigate. In alternate embodiments, a simplified mobile version may be provided either through a browser or via a dedicated app. Home screen 1200 can include search and share box 1250, which can operate as described above. Any number of mechanisms (e.g., dialog boxes, drop down menus, pop up menus, keyboard shortcuts, input device selections, audio input, for example, voice commands, eye tracking input) to access search functionality can be supported.

Figure 13:
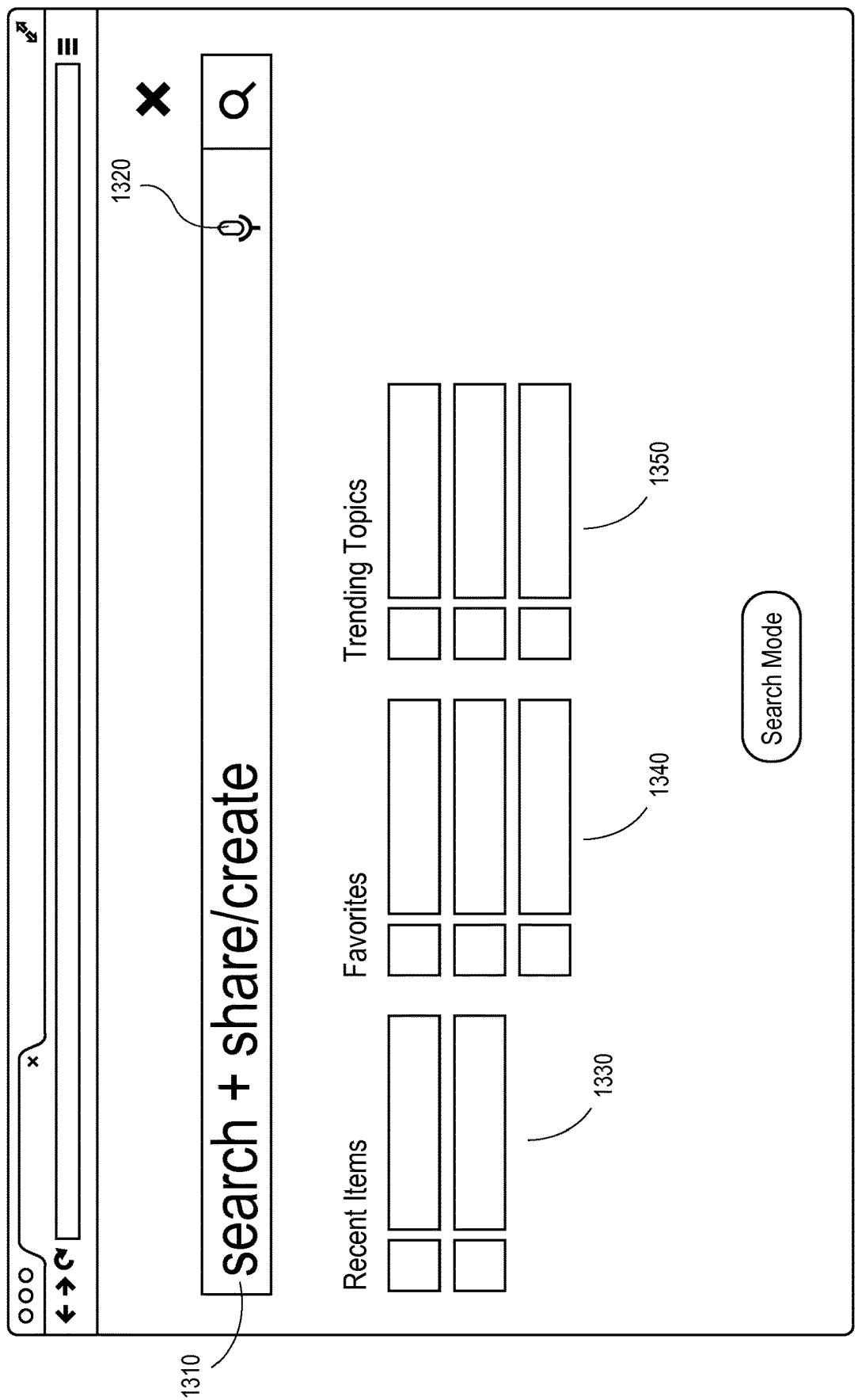
FIG. 13 is a graphical illustration of a search screen having shortcut lists that may be provided by a system utilizing the search functionality as described herein.

FIG. 13 is a graphical illustration of a search screen having shortcut lists that may be provided by a system utilizing the search functionality as described herein. In one embodiment, the search screen is accessible via a browser application; however, other applications may provide similar search functionality. Search and share/create dialog box 1310 may be utilized for entering search terms. Search terms may be entered by typing or otherwise providing input through an input device.

In one embodiment, audio input trigger 1320 may be utilized to provide audio input (e.g., speech input) to dialog box 1310. Any speech-to-text technology may be used to receive speech inputs and enter them into dialog box 1310. In one embodiment, the search and share screen may provide other useful links or shortcuts. For example, the search and share screen may include one or more recently accessed items 1330. In one embodiment, recently accessed items 1330 may include, for example, recently opened, edited and/or viewed database objects.

In one embodiment, a cache is maintained of up to a pre-selected number records per object type (i.e. up to 100 accounts, up to 100 contacts, up to 100 custom object records for each custom object, etc.) for each use in recently accessed items 1330. Access to a subset of these objects may be provided via links or other mechanisms on the search and share screen. When the user searches or starts to share, this list may be used as the basis for auto-complete to show the user records they have recently viewed, edited, or looked up so that the user can short-cut to that record by selecting a record from the list. In alternate embodiments, different cache sizes may be maintained (e.g., 50 records per object type, 100 total records, 250 records per object type).

In one embodiment, the search and share screen may include one or more favorite items 1340. In one embodiment, favorite items 1340 may include, for example, frequently opened, edited and/or viewed database objects. Favorite items 1340 may be automatically determined by monitoring and analyzing a user's past search activity and/or favorite items 1340 may be designated by the user for inclusion on the search and share screen.

In one embodiment, the search and share screen may include one or more trending topics 1350. In one embodiment, trending topics 1350 may include, for example, frequently opened, edited and/or viewed database objects, terms, search strings, files and/or actions for multiple users within a group. Trending topics 1350 may be automatically determined by monitoring and analyzing a group's past search activity and/or trending topics 1350 may be designated by one or more users within the group for inclusion on the search screen.

Figure 14:
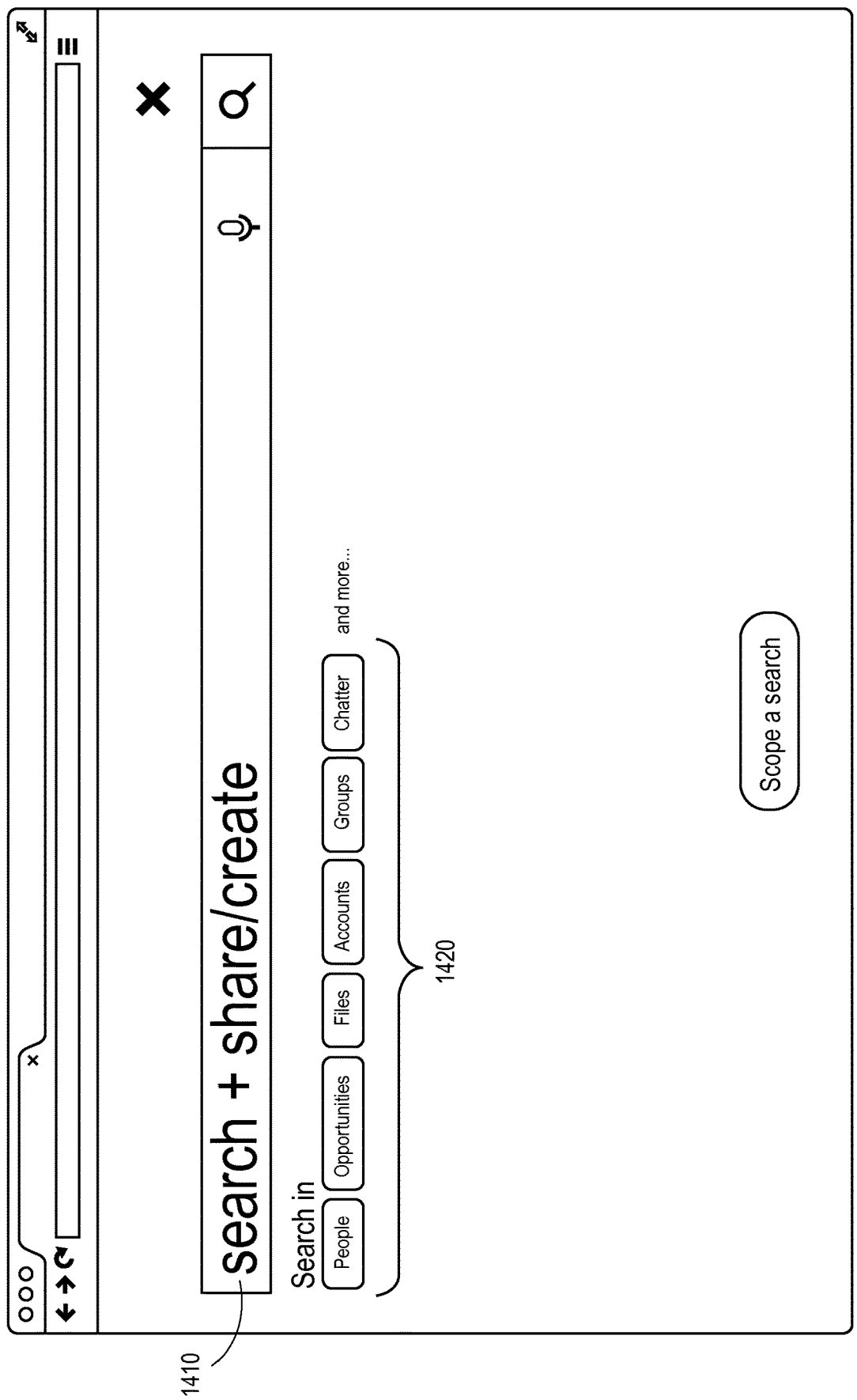
FIG. 14 is a graphical illustration of a search and share screen having object type filters that may be provided by a system utilizing the search and share functionality as described herein.

FIG. 14 is a graphical illustration of a search and share screen having object type filters that may be provided by a system utilizing the search and share functionality as described herein. In one embodiment, the search and share screen is accessible via a browser application; however, other applications may provide similar search functionality. Search and share/create dialog box 1410 may be utilized for entering search terms and/or content to share.

Object type filtering may be accomplished by providing object filter button 1420, for example, to allow a user to select the object types to be included in the search and share results. The object types available may be dependent upon the types of data stored in the database to be searched. In the example of FIG. 14, object types, such as people, opportunities, files, accounts, groups and/or social media (e.g., Chatter) may be included in, or excluded from, the search results by using buttons or other mechanisms on the search screen.

Figure 15:
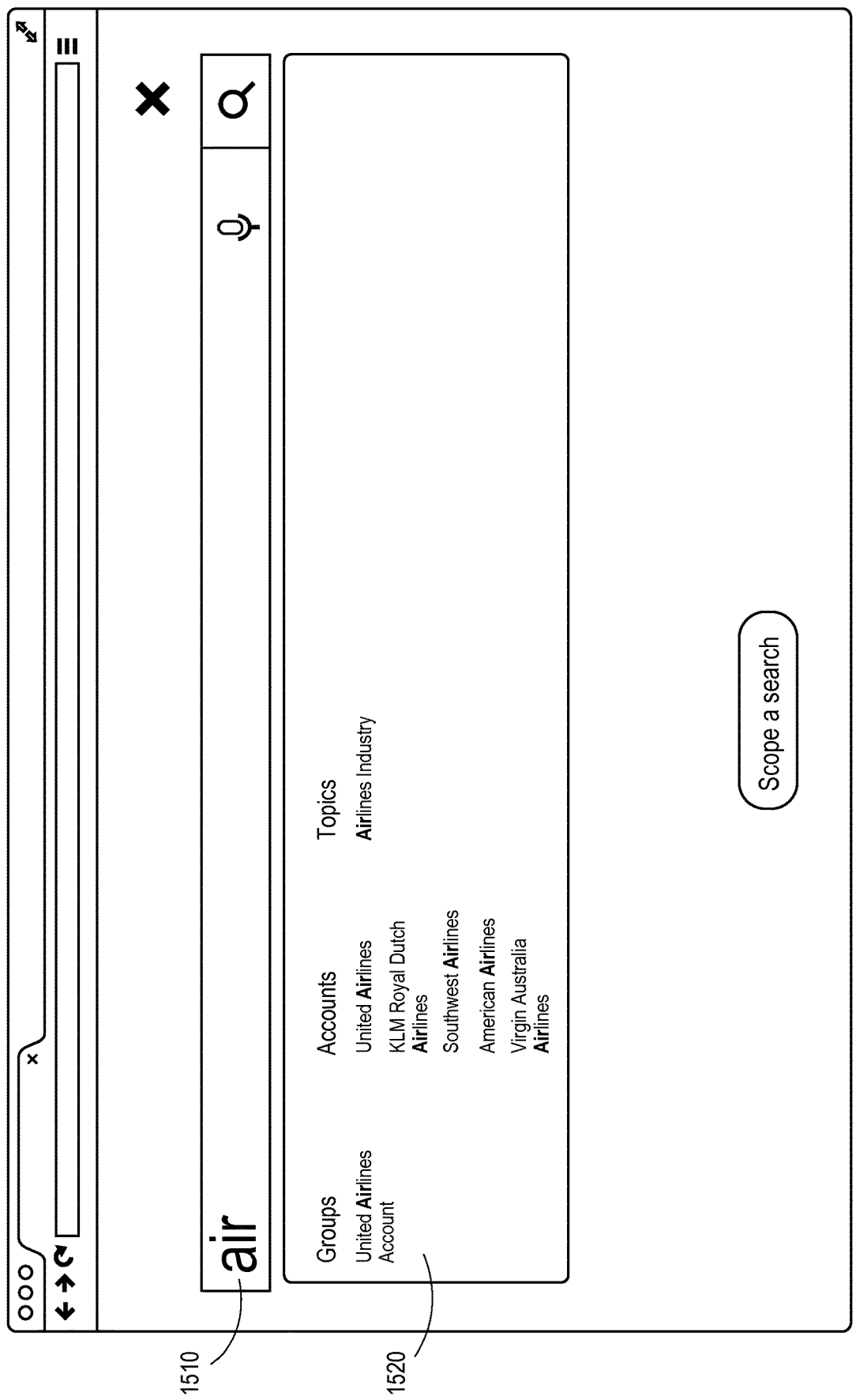
FIG. 15 is a graphical illustration of a search and share screen having a search input with suggested results provided by a system utilizing the search and share functionality as described herein.

FIG. 15 is a graphical illustration of a search and share screen having a search input with suggested results provided by a system utilizing the search and share functionality as described herein. In the example of FIG. 15, "air" has been entered into search and share dialog box 1510. This may be a partial or a complete search and may have been entered by a keyboard or other alphanumeric input or via speech input.

In response to the input, the search mechanism can provide results 1520. In one embodiment, results 1520 can be organized by type. In the example of FIG. 15, the types can include groups, accounts and topics. These are merely example types and many other types can also be supported. Selecting (e.g., clicking) one of the results would take a user to the selected object or can allow the user to share the selected object in a social media feed. For example, selecting a result in the group list may take the user to a group page that provides further navigation options, or may allow the user to share the group (or group information) in a social media mechanism.

Figure 16:
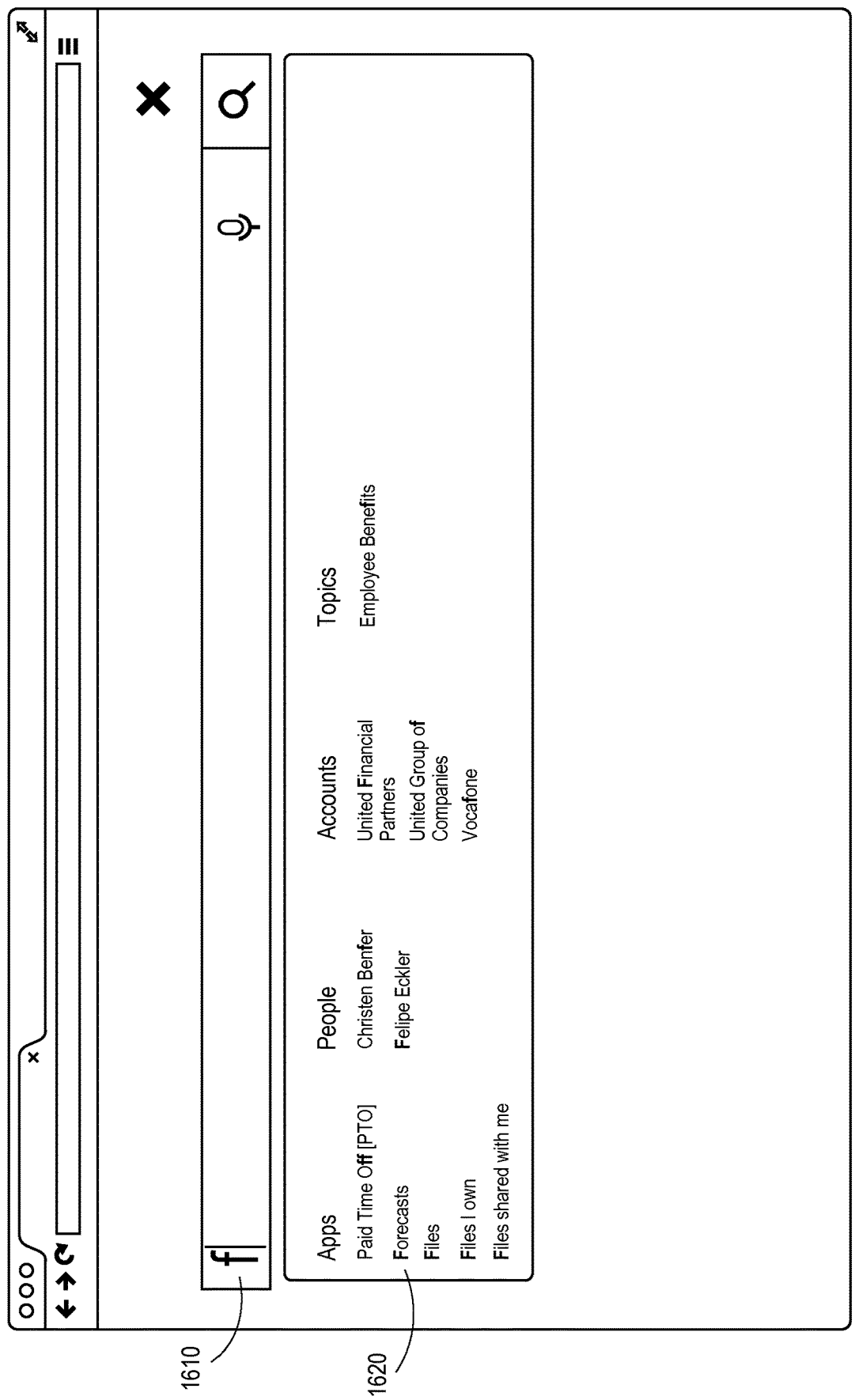
FIG. 16 is a graphical illustration of a search and share screen having a search and share input with suggested results provided by a system utilizing the search and share functionality as described herein.

FIG. 16 is a graphical illustration of a search and share screen having a search and share input with suggested results provided by a system utilizing the search and share functionality as described herein. In the example of FIG. 16, "f" has been entered into search and share dialog box 1610. This may be a partial or a complete search and may have been entered by a keyboard or other alphanumeric input or via speech input.

In response the search screen displays suggested results, 1620, organized by type as well as an app having a name/title that matches the string in dialog box 1610. The user may access results 1620 as described above and may launch the app and/or share objects (e.g., people, accounts, topics) provided.

Figure 17:
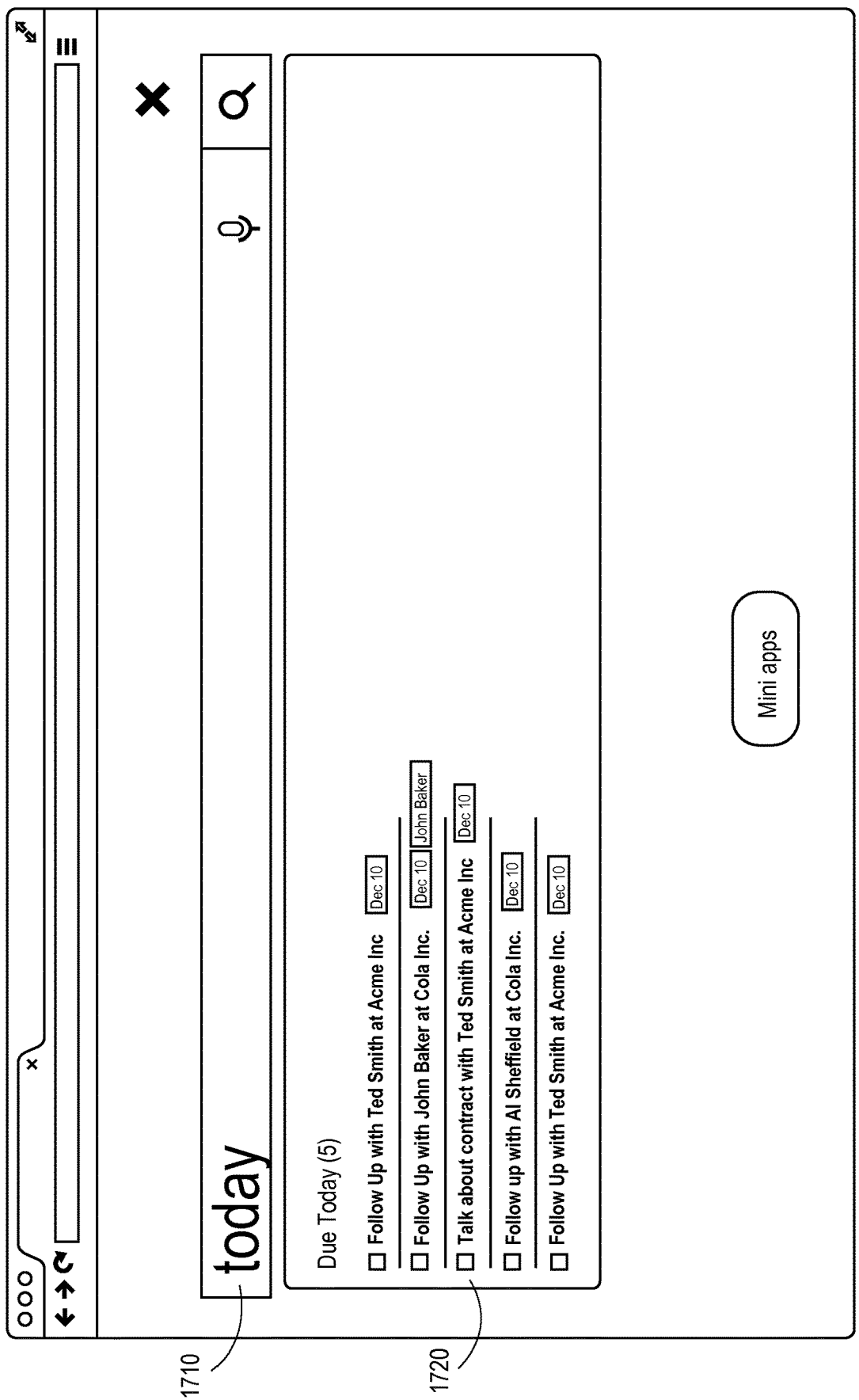
FIG. 17 is a graphical illustration of a search screen having a search input with suggested results provided by a system utilizing the search functionality as described herein.

FIG. 17 is a graphical illustration of a search screen having a search input with suggested results provided by a system utilizing the search functionality as described herein. In the example of FIG. 17, "today" has been entered into search and share dialog box 1710. This may be a partial or a complete search and may have been entered by a keyboard or other alphanumeric input or via speech input. Suggested results 1720 corresponding to items due that day is provided to the user.

In one embodiment, one or more preselected terms and/or phrases (e.g., today, tomorrow, yesterday, this week, next week) can be used to trigger a more complex search and provide results to the user via the search screen. For example, a user may enter the term "today" by any appropriate mechanism (e.g., typing, speech) and suggested results 1720 may provide all to do items due that day. Other results may also be provided. For example, in response to a "today" input, contact birthdays, news items or social media updates for selected entities may be provided. Any one or more of the items from the results list can be shared via search and share dialog box 1710. If "today" does not provide the desired results, new content can be created for that day or for future available times as determined from a calendar or other source. As another example, terms like "followup" can cause creation of a calendar entry in the future if not already created.

That is, a preselected input may be used to trigger a more complex search that is not merely a suggested search or result. The preselected input may operate as a trigger or a macro to provide useful results to the user. Other examples may be non-temporal, such as, "news" may provide headlines or "scores" may provide sports scores.

Figure 18:
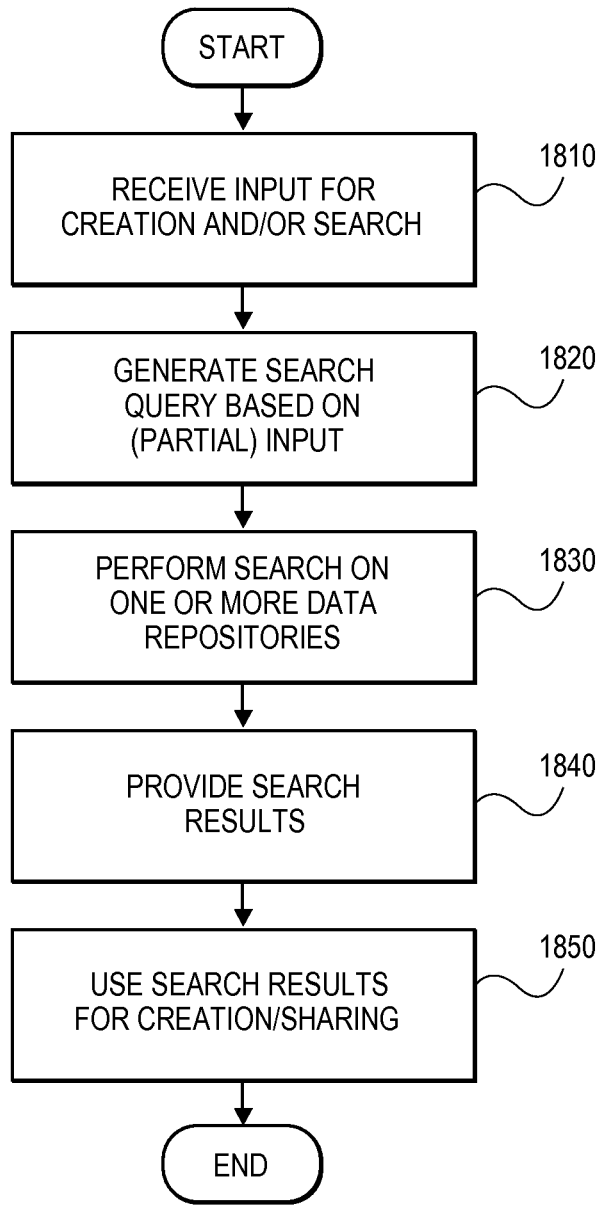
FIG. 18 is a flow diagram of one embodiment of a technique for combined search and content creation.

FIG. 18 is a flow diagram of one embodiment of a technique for combined search and content creation. The flow diagram of FIG. 18 is an example flow that can be utilized to provide combined search and creation/sharing as described above. A user can be provided with various search and share options as described above, for example, on a mobile device or on a desktop or laptop computing device.

Input can be received for search and/or creation, 1810. As described above, a search and share box may be provided. Alternatively, any search mechanism can operate as described herein. The user interface is not required to have a search as well as a search and share mechanism. The input can be received, for example, via voice input, keyboard, touch screen, and/or any other input mechanism. The techniques described herein can be performed on partial as well as complete search input strings.

A search query can be generated base on the input received, 1820. The input can be partial input. That is, the process can start with the first input received (e.g., first key stroke, first screen tap) and can be refined as further input is received. The search query/queries can be for one or more repositories accessible by a user providing the input. For example, queries can be directed to one or more of calendars, contact lists, email accounts, CRM data, corporate databases, web search portals, data corresponding to apps, databases, etc.

Searches are performed based on the query/queries, 1830. These searches can be performed in any manner known in the art. Further, the searches can be performed in parallel or sequentially, as well as by one device or spread over multiple devices.

The search results are provided to the user, 1840. Examples of layouts and structures for providing the search results are described above. Other layouts can also be used. In some examples, the results can have links or buttons or other mechanisms that allow a user to easily select one or more objects from the search results to be used for content creation and/or sharing. The selected search results are utilized for sharing and/or content creation, 1850. Examples of sharing and content creation are described above.

Figure 19:
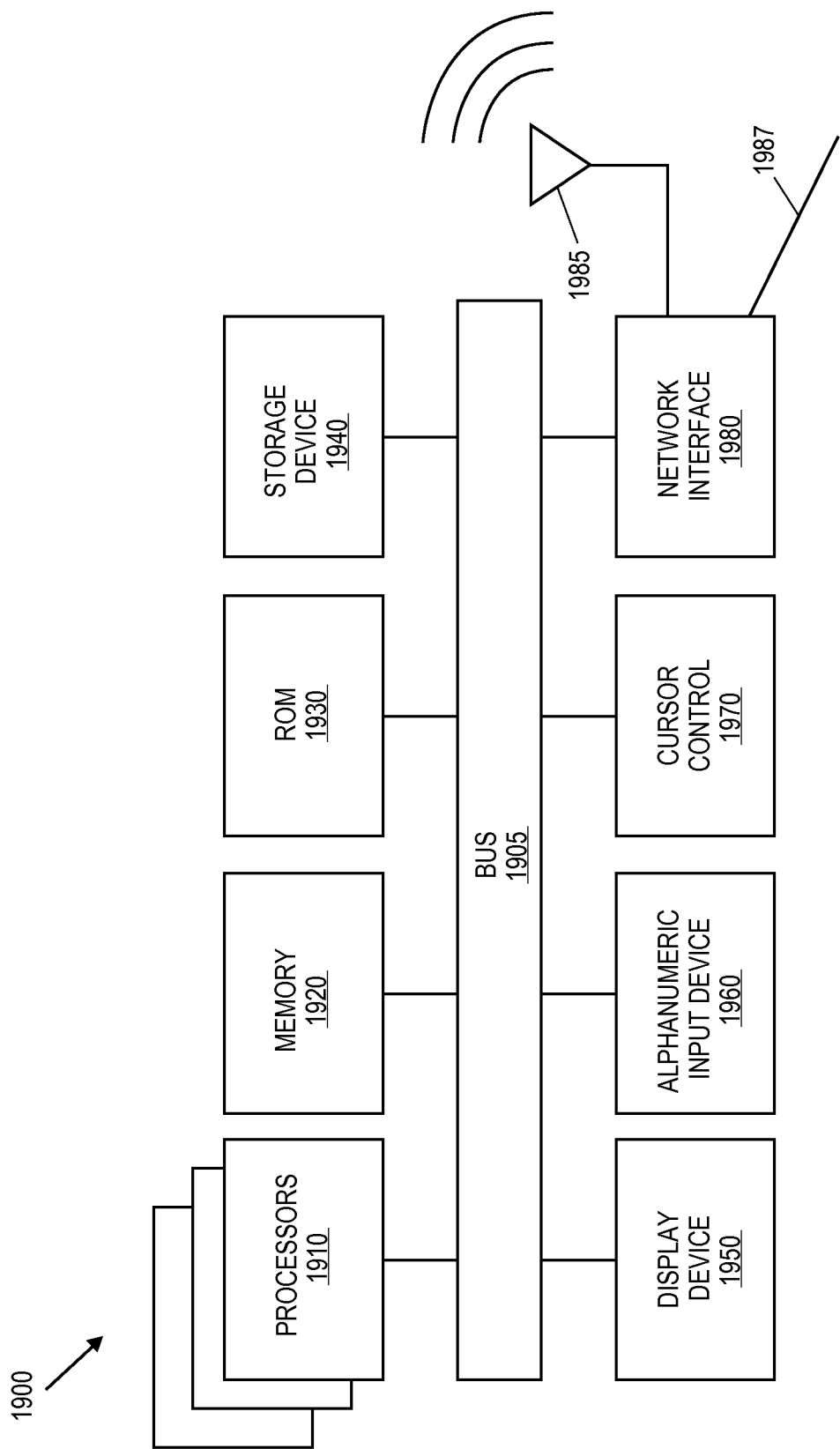
FIG. 19 is a block diagram of one embodiment of an electronic computing system that can be used as part of a combined search and content creation mechanism.

FIG. 19 is a block diagram of one embodiment of an electronic computing system that can be used as part of a combined search and content creation mechanism. The electronic system illustrated in FIG. 19 is intended to represent a range of electronic systems (either wired or wireless) including, for example, desktop computer systems, laptop computer systems, cellular telephones, tablets including cellular-enabled PDAs, set top boxes, thin devices, etc. Alternative electronic systems may include more, fewer and/or different components.

Electronic system 1900 includes bus 1905 or other communication device to communicate information, and processor 1910 coupled to bus 1905 that may process information. While electronic system 1900 is illustrated with a single processor, electronic system 1900 may include multiple processors and/or co-processors. Electronic system 1900 further may include random access memory (RAM) or other dynamic storage device 1920 (referred to as main memory), coupled to bus 1905 and may store information and instructions that may be executed by processor 1910. Main memory 1920 may also be used to store temporary variables or other intermediate information during execution of instructions by processor 1910.

Electronic system 1900 may also include read only memory (ROM) 1930 and/or other static storage device coupled to bus 1905 that may store static information and instructions for processor 1910. Data storage device 1940 may be coupled to bus 1905 to store information and instructions. Data storage device 1940 such as a magnetic disk or optical disc and corresponding drive may be coupled to electronic system 1900.

Electronic system 1900 may also be coupled via bus 1905 to display device 1950, such as a cathode ray tube (CRT) or liquid crystal display (LCD), to display information to a user. Alphanumeric input device 1960, including alphanumeric and other keys, may be coupled to bus 1905 to communicate information and command selections to processor 1910. Another type of user input device is cursor control 1970, such as a mouse, a trackpad, or cursor direction keys to communicate direction information and command selections to processor 1910 and to control cursor movement on display 1950.

Electronic system 1900 further may include network interface(s) 1980 to provide access to a network, such as a local area network. Network interface(s) 1980 may include, for example, a wireless network interface having antenna 1985, which may represent one or more antenna(e). Network interface(s) 1980 may also include, for example, a wired network interface to communicate with remote devices via network cable 1987, which may be, for example, an Ethernet cable, a coaxial cable, a fiber optic cable, a serial cable, or a parallel cable.

In one embodiment, network interface(s) 1980 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 1980 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Figure 20:
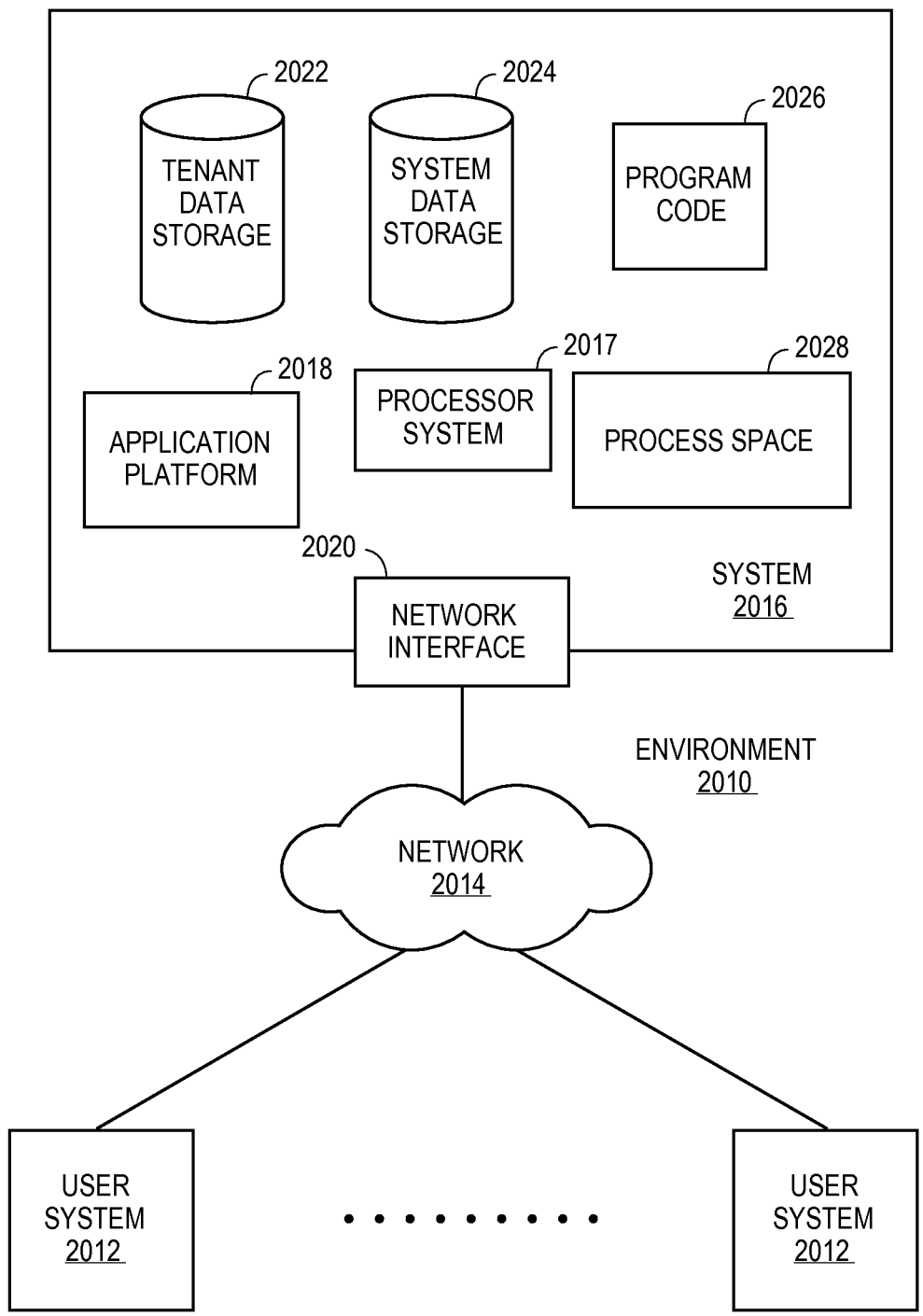
FIG. 20 illustrates a block diagram of an environment wherein an on-demand database service might be used according to one embodiment.

FIG. 20 illustrates a block diagram of an environment 2010 wherein an on-demand database service might be used. Environment 2010 may include user systems 2012, network 2014, system 2016, processor system 2017, application platform 2018, network interface 2020, tenant data storage 2022, system data storage 2024, program code 2026, and process space 2028. In other embodiments, environment 2010 may not have all of the components listed and/or may have other elements instead of, or in addition to, those listed above.

Environment 2010 is an environment in which an on-demand database service exists. User system 2012 may be any machine or system that is used by a user to access a database user system. For example, any of user systems 2012 can be a handheld computing device, a mobile phone, a laptop computer, a work station, and/or a network of computing devices. As illustrated in herein FIG. 20 (and in more detail in FIG. 21) user systems 2012 might interact via a network 2014 with an on-demand database service, which is system 2016.

An on-demand database service, such as system 2016, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 2016" and "system 2016" will be used interchangeably herein. A database image may include one or more database objects. A relational database management system (RDMS) or the equivalent may execute storage and retrieval of information against the database object(s). Application platform 2018 may be a framework that allows the applications of system 2016 to run, such as the hardware and/or software, e.g., the operating system. In an embodiment, on-demand database service 2016 may include an application platform 2018 that enables creation, managing and executing one or more applications developed by the provider of the on-demand database service, users accessing the on-demand database service via user systems 2012, or third party application developers accessing the on-demand database service via user systems 2012.

The users of user systems 2012 may differ in their respective capacities, and the capacity of a particular user system 2012 might be entirely determined by permissions (permission levels) for the current user. For example, where a salesperson is using a particular user system 2012 to interact with system 2016, that user system has the capacities allotted to that salesperson. However, while an administrator is using that user system to interact with system 2016, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 2014 is any network or combination of networks of devices that communicate with one another. For example, network 2014 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 2012 might communicate with system 2016 using TCP/IP and, at a higher network level, use other common Internet protocols to communicate, such as HTTP, FTP, AFS, WAP, etc. In an example where HTTP is used, user system 2012 might include an HTTP client commonly referred to as a "browser" for sending and receiving HTTP messages to and from an HTTP server at system 2016. Such an HTTP server might be implemented as the sole network interface between system 2016 and network 2014, but other techniques might be used as well or instead. In some implementations, the interface between system 2016 and network 2014 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 2016, shown in FIG. 20, implements a web-based customer relationship management (CRM) system. For example, in one embodiment, system 2016 includes application servers configured to implement and execute CRM software applications as well as provide related data, code, forms, webpages and other information to and from user systems 2012 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 2016 implements applications other than, or in addition to, a CRM application. For example, system 2016 may provide tenant access to multiple hosted (standard and custom) applications, including a CRM application. User (or third party developer) applications, which may or may not include CRM, may be supported by the application platform 2018, which manages creation, storage of the applications into one or more database objects and executing of the applications in a virtual machine in the process space of the system 2016.

One arrangement for elements of system 2016 is shown in FIG. 20, including a network interface 2020, application platform 2018, tenant data storage 2022 for tenant data 2023, system data storage 2024 for system data 2025 accessible to system 2016 and possibly multiple tenants, program code 2026 for implementing various functions of system 2016, and a process space 2028 for executing MTS system processes and tenant-specific processes, such as running applications as part of an application hosting service. Additional processes that may execute on system 2016 include database indexing processes.

Several elements in the system shown in FIG. 20 include conventional, well-known elements that are explained only briefly here. For example, each user system 2012 could include a desktop personal computer, workstation, laptop, PDA, cell phone, or any wireless access protocol (WAP) enabled device or any other computing device capable of interfacing directly or indirectly to the Internet or other network connection. User system 2012 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 2012 to access, process and view information, pages and applications available to it from system 2016 over network 2014. Each user system 2012 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 2016 or other systems or servers. For example, the user interface device can be used to access data and applications hosted by system 2016, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 2012 and all of its components are operator configurable using applications, such as a browser, including computer code run using a processor. Similarly, system 2016 (and additional instances of an MTS, where more than one is present) and all of their components might be operator configurable using application(s) including computer code to run using a central processing unit such as processor system 2017, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 2016 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 2016 is configured to provide webpages, forms, applications, data and media content to user (client) systems 2012 to support the access by user systems 2012 as tenants of system 2016. As such, system 2016 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 21:
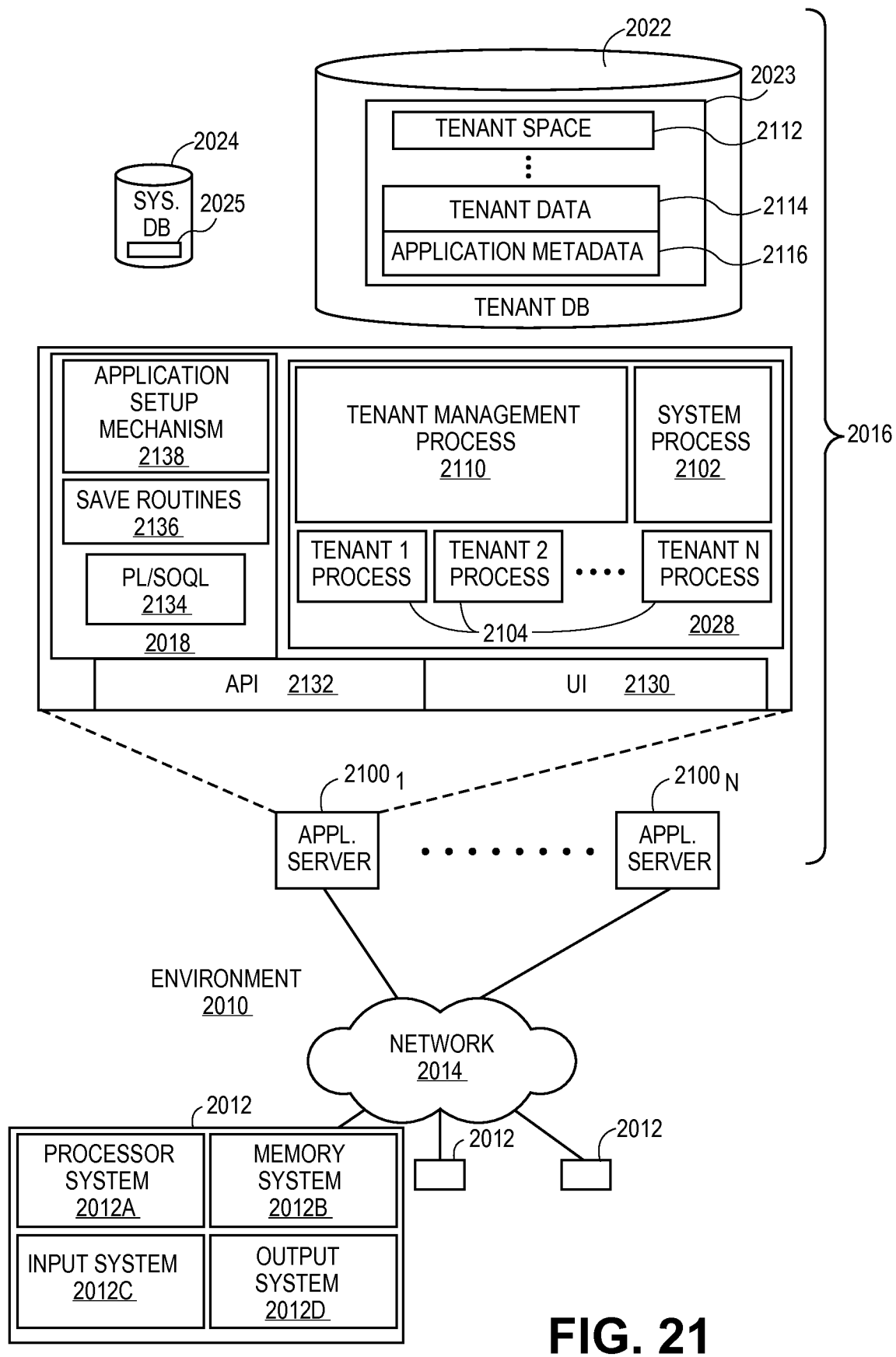
FIG. 21 illustrates a block diagram of an embodiment of elements of environment of FIG. 20 and various possible interconnections between these elements according to one embodiment.

FIG. 21 also illustrates environment 2010. However, in FIG. 21 elements of system 2016 and various interconnections in an embodiment are further illustrated. FIG. 21 shows that user system 2012 may include processor system 2012A, memory system 2012B, input system 2012C, and output system 2012D. FIG. 21 shows network 2014 and system 2016. FIG. 21 also shows that system 2016 may include tenant data storage 2022, tenant data 2023, system data storage 2024, system data 2025, User Interface (UI) 2130, Application Program Interface (API) 2132, PL/SOQL 2134, save routines 2136, application setup mechanism 2138, applications servers $2100_1$-$2100_N$, system process space 2102, tenant process spaces 2104, tenant management process space 2110, tenant storage space 2112, tenant data 2114, and application metadata 2116. In other embodiments, environment 2010 may not have the same elements as those listed above and/or may have other elements instead of, or in addition to, those listed above.

User system 2012, network 2014, system 2016, tenant data storage 2022, and system data storage 2024 were discussed above in FIG. 20. Regarding user system 2012, processor system 2012A may be any combination of one or more processors. Memory system 2012B may be any combination of one or more memory devices, short term, and/or long term memory. Input system 2012C may be any combination of input devices, such as one or more keyboards, mice, trackballs, scanners, cameras, and/or interfaces to networks. Output system 2012D may be any combination of output devices, such as one or more monitors, printers, and/or interfaces to networks. As shown by FIG. 21, system 2016 may include a network interface 2020 (of FIG. 20) implemented as a set of HTTP application servers 2100, an application platform 2018, tenant data storage 2022, and system data storage 2024. Also shown is system process space 2102, including individual tenant process spaces 2104 and a tenant management process space 2110. Each application server 2100 may be configured to tenant data storage 2022 and the tenant data 2023 therein, and system data storage 2024 and the system data 2025 therein to serve requests of user systems 2012. The tenant data 2023 might be divided into individual tenant storage spaces 2112, which can be either a physical arrangement and/or a logical arrangement of data. Within each tenant storage space 2112, tenant data 2114 and application metadata 2116 might be similarly allocated for each user. For example, a copy of a user's most recently used (MRU) items might be stored to tenant data 2114. Similarly, a copy of MRU items for an entire organization that is a tenant might be stored to tenant storage space 2112. A UI 2130 provides a user interface and an API 2132 provides an application programmer interface to system 2016 resident processes to users and/or developers at user systems 2012. The tenant data and the system data may be stored in various databases, such as one or more Oracle™ databases.

Application platform 2018 includes an application setup mechanism 2138 that supports application developers' creation and management of applications, which may be saved as metadata into tenant data storage 2022 by save routines 2136 for execution by subscribers as one or more tenant process spaces 2104 managed by tenant management process 2110 for example. Invocations to such applications may be coded using PL/SOQL 2134 that provides a programming language style interface extension to API 2132. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 2116 for the subscriber making the invocation and executing the metadata as an application in a virtual machine.

Each application server 2100 may be communicably coupled to database systems, e.g., having access to system data 2025 and tenant data 2023, via a different network connection. For example, one application server 2100$_1$ might be coupled via the network 2014 (e.g., the Internet), another application server 2100$_{N-1}$ might be coupled via a direct network link, and another application server 2100$_N$ might be coupled by yet a different network connection. Transfer Control Protocol and Internet Protocol (TCP/IP) are typical protocols for communicating between application servers 2100 and the database system. However, it will be apparent to one skilled in the art that other transport protocols may be used to optimize the system depending on the network interconnect used.

In certain embodiments, each application server 2100 is configured to handle requests for any user associated with any organization that is a tenant. Because it is desirable to be able to add and remove application servers from the server pool at any time for any reason, there is preferably no server affinity for a user and/or organization to a specific application server 2100. In one embodiment, therefore, an interface system implementing a load balancing function (e.g., an F5 Big-IP load balancer) is communicably coupled between the application servers 2100 and the user systems 2012 to distribute requests to the application servers 2100. In one embodiment, the load balancer uses a least connections algorithm to route user requests to the application servers 2100. Other examples of load balancing algorithms, such as round robin and observed response time, also can be used. For example, in certain embodiments, three consecutive requests from the same user could hit three different application servers 2100, and three requests from different users could hit the same application server 2100. In this manner, system 2016 is multi-tenant, wherein system 2016 handles storage of, and access to, different objects, data and applications across disparate users and organizations.

As an example of storage, one tenant might be a company that employs a sales force where each salesperson uses system 2016 to manage their sales process. Thus, a user might maintain contact data, leads data, customer follow-up data, performance data, goals and progress data, etc., all applicable to that user's personal sales process (e.g., in tenant data storage 2022). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 2016 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 2016 might also maintain system level data usable by multiple tenants or other data. Such system level data might include industry reports, news, postings, and the like that are sharable among tenants.

In certain embodiments, user systems 2012 (which may be client systems) communicate with application servers 2100 to request and update system-level and tenant-level data from system 2016 that may require sending one or more queries to tenant data storage 2022 and/or system data storage 2024. System 2016 (e.g., an application server 2100 in system 2016) automatically generates one or more SQL statements (e.g., one or more SQL queries) that are designed to access the desired information. System data storage 2024 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A non-transitory computer-readable medium having stored thereon instructions that are configurable, when executed by one or more processors, to cause the one or more processors to:
receive a single input stream of input via a single search and share graphical component of a graphical user interface on an electronic computing device corresponding to an on-demand services environment having at least a database and social media mechanism to provide a real-time platform that sends information proactively via a feed configurable by users thereof, the graphical user interface having the single search and share graphical component within the graphical user interface as one of multiple graphical components, the single search and share graphical component to provide an ability to search at least the database as well as share content in the feed in a single process involving only the search and share graphical component;
analyze the single input stream to determine whether the user is attempting to search for content, create content, or share content in the feed;
determine, in response to analyzing the single stream of input via the search and share graphical component, at least one recipient of the content to be shared;
generate a search query in response to receiving the input via the search and share graphical component if the analyzing indicates the user is attempting to search for content;
search at least the database for objects matching the search query received via the search and share graphical component;
provide, on a display device via the search and share graphical component, results from the search comprising one or more objects selectable via the search and share graphical component; and
share content from the one or more selected objects from the results through the search and share graphical component with at least the at least one recipient utilizing the feed.

2. The computer-readable medium of claim 1 wherein the generated content comprises generating a post for a feed of a social media mechanism.

3. The computer-readable medium of claim 2 further comprising instructions that, when executed by the one or more processors, are configurable to cause the one or more processors to:
receive input indicating a selection of at least one of the one or more results;
automatically include the selected results on the post.

4. The computer-readable medium of claim 1 wherein content creation comprises generating an entry in the structured data repository.

5. The computer-readable medium of claim 4 wherein the structured data repository is part of an on-demand services environment.

6. The computer-readable medium of claim 5 wherein the on-demand services environment comprises a multitenant database environment having a plurality of tenants each having individual tenant information and the search query is specialized based on tenant information corresponding to a tenant from which the request originates, wherein the tenant information is retrieved from the multi-tenant database environment.

7. A method comprising:
receiving a single input stream of input via a single search and share graphical component of a graphical user interface on an electronic computing device corresponding to an on-demand services environment having at least a database and social media mechanism to provide a real-time platform that sends information proactively via a feed configurable by users thereof, the graphical user interface having the single search and share graphical component within the graphical user interface as one of multiple graphical components, the single search and share graphical component to provide an ability to search at least the database as well as share content in the feed in a single process involving only the search and share graphical component;
analyzing the single input stream to determine whether the user is attempting to search for content, create content, or share content in the feed;
determining, in response to analyzing the single stream of input via the search and share graphical component, at least one recipient of the content to be shared;

generating a search query in response to receiving the input via the search and share graphical component if the analyzing indicates the user is attempting to search for content;

search at least the database for objects matching the search query received via the search and share graphical component;

providing, on a display device via the search and share graphical component, results from the search comprising one or more objects selectable via the search and share graphical component; and sharing content from the one or more selected objects from the results through the search and share graphical component with at least the at least one recipient utilizing the feed.

8. The method of claim 7 wherein the generated content comprises generating a post for a feed of a social media mechanism.

9. The method of claim 8 further comprising:

receiving input indicating a selection of at least one of the one or more results;

automatically including the selected results on the post.

10. The method of claim 7 wherein content creation comprises generating an entry in the structured data repository.

11. The method of claim 10 wherein the structured data repository is part of an on-demand services environment.

12. The method of claim 11 wherein the on-demand services environment comprises a multitenant database environment having a plurality of tenants each having individual tenant information and the search query is specialized based on tenant information corresponding to a tenant from which the request originates, wherein the tenant information is retrieved from the multi-tenant database environment.

13. A client computing device communicatively coupled with one or more server computing devices, the client computing device to receive a single input stream of input via a single search and share graphical component of a graphical user interface on an electronic computing device corresponding to an on-demand services environment having at least a database and social media mechanism to provide a real-time platform that sends information proactively via a feed configurable by users thereof, the graphical user interface having the single search and share graphical component within the graphical user interface as one of multiple graphical components, the single search and share graphical component to provide an ability to search at least the database as well as share content in the feed in a single process involving only the search and share graphical component, to analyze the single input stream to determine whether the user is attempting to search for content, create content, or share content in the feed, to determine, in response to analyzing the single stream of input via the search and share graphical component, at least one recipient of the content to be shared, to generate a search query in response to receiving the input via the search and share graphical component if the analyzing indicates the user is attempting to search for content, to search at least the database for objects matching the search query received via the search and share graphical component, to provide, on a display device via the search and share graphical component, results from the search comprising one or more objects selectable via the search and share graphical component, and to share content from the one or more selected objects from the results through the search and share graphical component with at least the at least one recipient utilizing the feed.

14. The system of claim 13 wherein content creation comprises generating a post for a feed of a social media mechanism.

15. The system of claim 14 wherein the client computing device further operates to receive input indicating a selection of at least one of the one or more results, and to automatically include the selected results on the post.

16. The system of claim 13 wherein content creation comprises generating an entry in the structured data repository.

17. The system of claim 16 wherein the structured data repository is part of an on-demand services environment.

18. The system of claim 17 wherein the on-demand services environment comprises a multitenant database environment.

* * * * *